US011196806B2

United States Patent
(12) United States Patent
Saito et al.

(10) Patent No.: US 11,196,806 B2
(45) Date of Patent: Dec. 7, 2021

(54) METHOD AND APPARATUS FOR REPLICATING DATA BETWEEN STORAGE SYSTEMS

(71) Applicant: Hitachi, Ltd., Tokyo (JP)

(72) Inventors: Hideo Saito, Tokyo (JP); Keisuke Hatasaki, Tokyo (JP); Akira Yamamoto, Tokyo (JP)

(73) Assignee: HITACHI, LTD., Tokyo (JP)

( * ) Notice: Subject to any disclaimer, the term of this patent is extended or adjusted under 35 U.S.C. 154(b) by 390 days.

(21) Appl. No.: 16/073,299

(22) PCT Filed: Apr. 25, 2016

(86) PCT No.: PCT/US2016/029259
§ 371 (c)(1),
(2) Date: Jul. 26, 2018

(87) PCT Pub. No.: WO2017/188929
PCT Pub. Date: Nov. 2, 2017

(65) Prior Publication Data

US 2019/0037016 A1 Jan. 31, 2019

(51) Int. Cl.

| | |
|---|---|
| ***G06F 15/16*** | (2006.01) |
| ***H04L 29/08*** | (2006.01) |
| ***G06F 13/00*** | (2006.01) |
| ***G06F 12/16*** | (2006.01) |
| ***G06F 11/14*** | (2006.01) |
| ***G06F 3/06*** | (2006.01) |

(52) U.S. Cl.
CPC ........ *H04L 67/1095* (2013.01); *G06F 3/0604* (2013.01); *G06F 3/065* (2013.01); *G06F 3/067* (2013.01); *G06F 11/1448* (2013.01); *G06F 12/16* (2013.01); *G06F 13/00* (2013.01); *H04L 67/1097* (2013.01); *G06F 2201/80* (2013.01); *G06F 2201/84* (2013.01)

(58) Field of Classification Search
None
See application file for complete search history.

(56) References Cited

U.S. PATENT DOCUMENTS

2004/0250034 A1 12/2004 Yagawa et al.
2007/0233985 A1 10/2007 Malhora et al.
2009/0077302 A1* 3/2009 Fukuda ............... G06F 12/0868 711/103
2009/0106515 A1 4/2009 Arai et al.
2010/0011179 A1* 1/2010 Sano .................. G06F 11/2069 711/162
2011/0307675 A1 12/2011 Kano
2016/0092539 A1* 3/2016 Compton ............. G06F 16/275 707/611

* cited by examiner

*Primary Examiner* — Alex Gofman
(74) *Attorney, Agent, or Firm* — Procopio, Cory, Hargreaves & Savitch LLP

(57) ABSTRACT

Example implementations described herein are directed to replication of data between different environments selectively while maintaining the performance of applications. The replication of data may be used to replicate data from a data center running a business critical application to another data center running an analytics application. In example implementations, a storage management program translates the IDs of database tables to storage locations, and the storage management program requests a storage system to replicate those storage locations to another storage system.

9 Claims, 23 Drawing Sheets

123A, 123B 1230A, 1230B — 1231A, 1231B — 1232A, 1232B

| Device ID | Storage System ID | Volume ID |
| --- | --- | --- |
| /dev/sda | 0 | 100 |
| /dev/sdb | 1 | 200 |
| ... | ... | ... |

2220A, 2220B | 2221A, 2221B | 2222A, 2222B | 2223A, 2223B | 2224A, 2224B | 2225A, 2225B | 2226A, 2226B | 2227A, 2227B | 2228A, 2228B

| Pair ID | Volume Type | Remote System ID | Source Volume ID | Destination Volume ID | Pair State | Replication Bitmap | Difference Bitmap | Bandwidth Limitation |
|---|---|---|---|---|---|---|---|---|
| 0 | Source | 0 | 100 | 100 | SMPL | Off, Off, ... | Off, Off, ... | None |
| 1 | Source | 1 | 200 | 100 | COPY | Off, On, ... | Off, Off, ... | 10% |
| 2 | Source | 1 | 300 | 200 | PAIR | On, Off ... | Off, Off, ... | 1 MB/sec |
| 3 | Destina-tion | 2 | 400 | 200 | SUSP | On, On, ... | Off, Off, ... | 10 MB/sec |
| ... | ... | ... | ... | ... | ... | ... | ... | ... |

222A, 222B

| Pair ID (2220A, 2220B) | Volume Type (2221A, 2221B) | Remote System ID (2222A, 2222B) | Source Volume ID (2223A, 2223B) | Destination Volume ID (2224A, 2224B) | Pair State (2225A, 2225B) | Replication Bitmap (2226A, 2226B) | Difference Bitmap (2227A, 2227B) | Bandwidth Limitation (2228A, 2228B) | Permission Bitmap (2229A, 2229B) |
|---|---|---|---|---|---|---|---|---|---|
| 0 | SRC | 0 | 100 | 100 | SMPL | Off, Off, ... | Off, Off, ... | None | Off, Off, ... |
| 1 | SRC | 1 | 200 | 100 | COPY | Off, On, ... | Off, On, ... | 10% | On, On, ... |
| 2 | SRC | 1 | 300 | 200 | PAIR | On, Off, ... | Off, Off, ... | 1 MB/sec | On, Off, ... |
| 3 | DST | 2 | 400 | 200 | SUSP | On, On, ... | On, Off, ... | 10 MB/sec | On, On, ... |
| ... | ... | ... | ... | ... | ... | ... | ... | ... | ... |

FIG. 15

FIG. 20
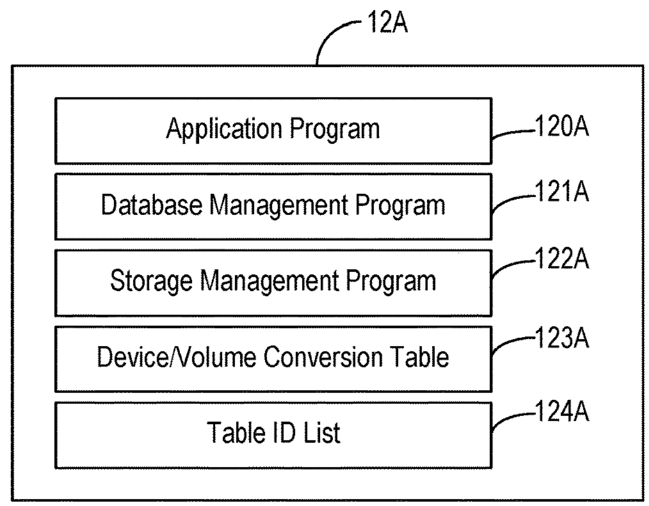
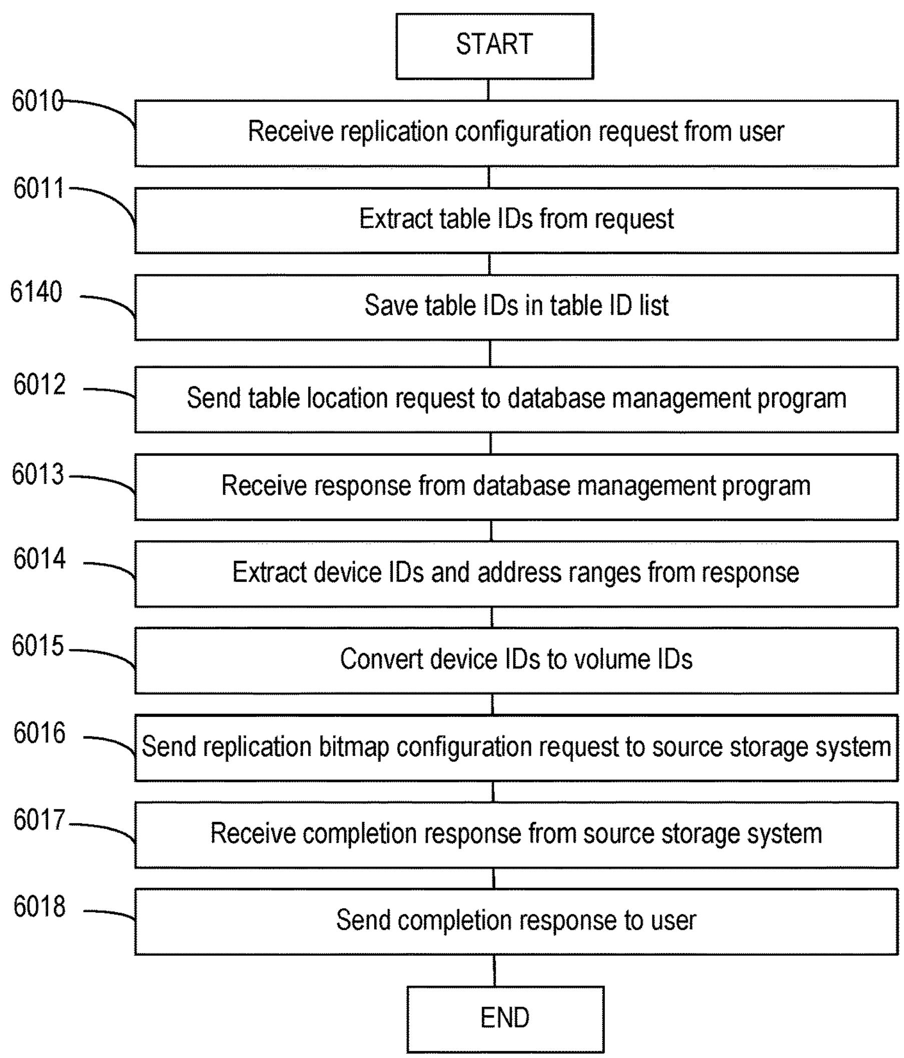
FIG. 21

222A, 222B

| Pair ID (2220A, 2220B) | Volume Type (2221A, 2221B) | Remote System ID (2222A, 2222B) | Source Volume ID (2223A, 2223B) | Destination Volume ID (2224A, 2224B) | Pair State (2225A, 2225B) | Replication Bit (2226A', 2226B') | Difference Bitmap (2227A, 2227B) | Bandwidth Limitation (2228A, 2228B) |
|---|---|---|---|---|---|---|---|---|
| 0 | Source | 0 | 100 | 100 | SMPL | Off | Off, Off, ... | None |
| 1 | Source | 1 | 200 | 100 | COPY | On | Off, On, ... | 10% |
| 2 | Source | 1 | 300 | 200 | PAIR | On | Off, Off, ... | 1 MB/sec |
| 3 | Destination | 2 | 400 | 200 | SUSP | On | On, Off, ... | 10 MB/sec |
| ... | ... | ... | ... | ... | ... | ... | ... | ... |

FIG. 25

METHOD AND APPARATUS FOR REPLICATING DATA BETWEEN STORAGE SYSTEMS

BACKGROUND

Field

The present disclosure is generally related to storage systems, and more specifically, to data replication between storage systems.

Related Art

In the related art, by using the data created by business critical applications along with other data, such as Internet of Things (IoT) data, social networking service (SNS) data and Open data, analytics applications can perform sophisticated analytics. Business critical applications and analytics applications often run in different environments. For example, business critical applications may run in one data center while analytics applications may run in another data center or in the Public Cloud.

In the related art, remote replication technologies can be used to copy the data of business critical applications from the business critical environment to the analytics environment. The remote replication can be executed either on the servers that run the applications or the storage systems that store the data.

In the related art, there are methods and apparatuses to manage object based tiers, which can involve a storage system configured to acquire information about where database tables are stored from an application, which then uses the information to manage data tiering. An example related art implementation can be found in U.S. Pat. No. 8,464,003, herein incorporated by reference in its entirety for all purposes.

In the related art, there are storage systems that are configured to replicate data to another storage system for higher availability. An example related art implementation can be found in U.S. Pat. No. 8,943,286, herein incorporated by reference in its entirety for all purposes.

SUMMARY

A user specifies the tables of databases that are to be replicated, a storage management program translates the IDs of the tables to storage locations, and the storage management program requests a storage system to replicate those storage locations to another storage system.

Aspects of the present disclosure include a storage system, which can involve a plurality of storage volumes, each of the plurality of storage volumes having a plurality of regions; a memory; and a processor, configured to, for receipt of a command to replicate a first volume of the plurality of storage volumes to a second volume of a second storage system, store, in the memory, replication information configured by a server that issued the command, wherein the replication information is indicative of, for each of the plurality of regions of the first volume, whether the each of the plurality of regions is replicable to the second volume or not replicable to the second volume; and replicate, to the second volume, first ones of the plurality of regions of the first volume indicated as replicable to the second volume by the replication information.

Additional aspects of the present disclosure can include a system, which can involve a server communicatively coupled to a first storage system and a second storage system, the server configured to determine volume identifiers for a first plurality of storage volumes of the first storage system from device identifiers and address ranges associated with a replication request, identify, from the volume identifiers, a first volume from the first plurality of storage volumes of the first storage system to be replicated to a second volume of a second plurality of storage volumes of the second storage system, and issue a command to the first storage system to replicate the first volume to the second volume. The system may include the first storage system, which can involve the first plurality of storage volumes, each of the first plurality of storage volumes having a plurality of regions; a memory; and a processor, configured to, for receipt of the command to replicate the first volume to the second volume, store replication information configured by the server in the memory, wherein the replication information is indicative of, for each of the plurality of regions of the first volume, whether the each of the plurality of regions is replicable to the second volume or not replicable to the second volume; and replicate, to the second volume, first ones of the plurality of regions of the first volume indicated as replicable to the second volume by the replication information.

Aspects of the present disclosure include a method, which can involve a plurality of storage volumes, each of the plurality of storage volumes having a plurality of regions; wherein for receipt of a command to replicate a first volume of the plurality of storage volumes to a second volume of a second storage system, managing replication information configured by a server that issued the command, wherein the replication information is indicative of, for each of the plurality of regions of the first volume, whether the each of the plurality of regions is replicable to the second volume or not replicable to the second volume; and replicating, to the second volume, first ones of the plurality of regions of the first volume indicated as replicable to the second volume by the replication information. The method may be stored in the form of computer instructions for execution by a processor. The computer instructions may be stored on a non-transitory computer readable medium.

BRIEF DESCRIPTION OF THE DRAWINGS

FIG. 15 illustrates logical layouts of Pair Management Tables, in accordance with an example implementation.

FIG. 20 illustrates a Logical Layout of a Memory, in accordance with an example implementation.

FIG. 21 illustrates a flow chart of a Replication Configuration by Storage Management Program, in accordance with an example implementation.

FIG. 25 illustrates the Logical Layouts of Pair Management Tables, in accordance with an example implementation.

DETAILED DESCRIPTION

Figure 1:
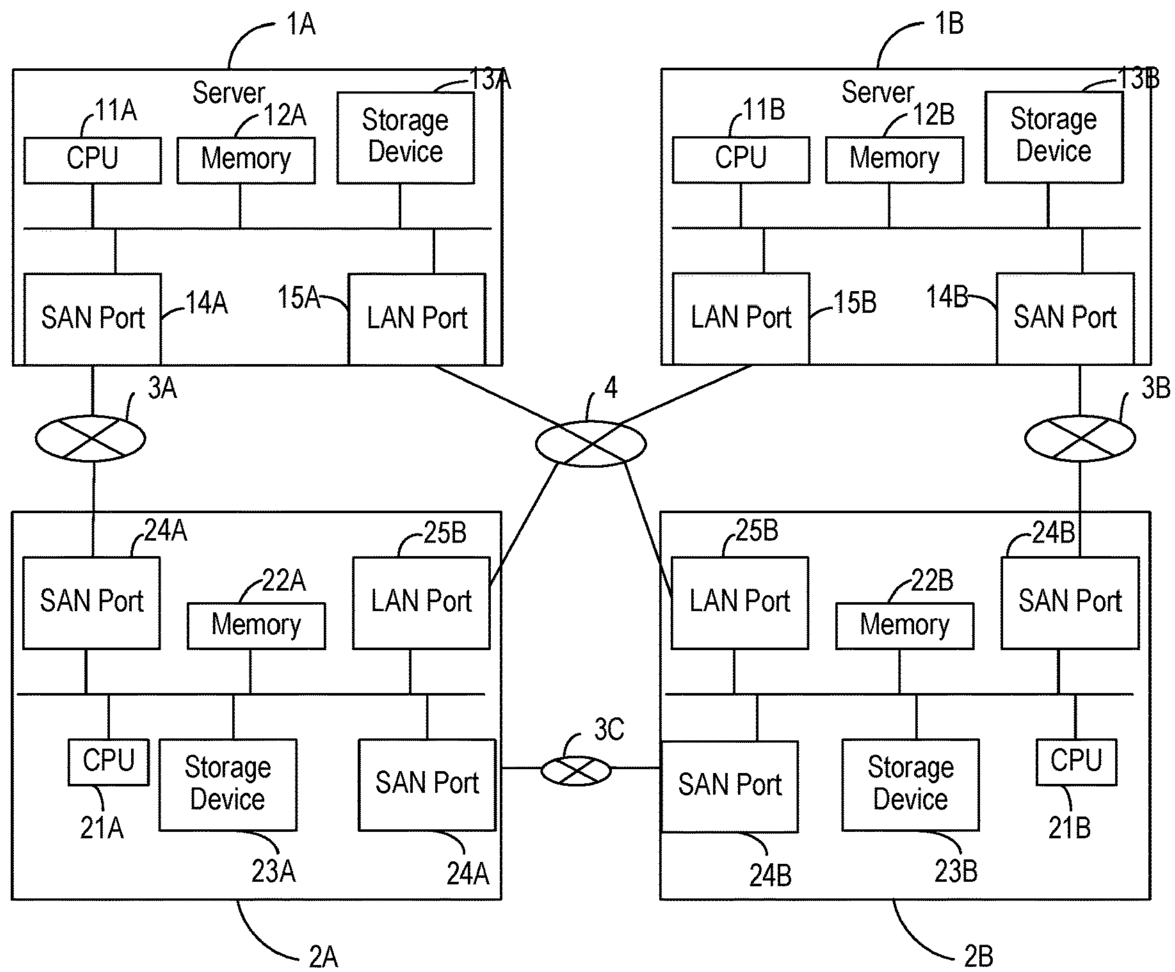
FIG. 1 illustrates an example of the physical configuration of the system in which the method and apparatus of the example implementations may be applied.

The following detailed description provides further details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. The terms "request" and "operation" may also be used interchangeably.

Replicating data from the business critical environment to the analytics environment takes a long time. Moreover, the data created by the business critical applications often contains sensitive information that should not leave the business critical environment. In the case of server-side remote replication, replication impacts the performance of the business critical applications. Example implementations are directed to provide a method and apparatus that allows data to be replicated between different environments selectively and without impacting the performance of applications.

Example implementations address the issues of related art solutions by providing a storage system that replicates a subset of the regions of one or more volumes to another storage system. Example implementations further facilitate a storage system that manages which subset of the regions of one or more volumes is permitted to be replicated to another storage system. Example implementations further involve a storage system that creates a consistent remote snapshot of a subset of the regions of one or more volumes, and includes a storage system that replicates a subset of one or more volumes to another storage system.

In a first example implementation, a storage system replicates a subset of the regions of one or more volumes to another storage system based on identifiers (IDs) of database tables specified by a user.

FIG. 1 illustrates an example of the physical configuration of the system in which the method and apparatus of the example implementations may be applied.

One or more Servers 1A and a Storage System 2A are connected to each other via a storage area network (SAN) 3A. One or more Servers 1B and a Storage System 2B are connected to each other via a SAN 3B. Storage System 2A and Storage System 2B are connected to each other via a SAN 3C. In one possible configuration of the system, Server 1A and Storage System 2A are in one data center, while Server 1B and Storage System 2B are in another data center. In another possible configuration of the system, Server 1A and Storage System 2A are in one part of a data center, while Server 1B and Storage System 2B are in another part of the same data center.

Server 1A, Storage System 2A, Server 1B and Storage System 2B are communicatively connected to each other via a local area network (LAN) 4. Alternatively, Server 1A and Storage System are connected to each other via a LAN, and Server 1B and Storage System 2B are connected to each other via a different LAN.

Server 1A can include one or more central processing units (CPUs) 11A, Memory 12A, one or more Storage Devices 13A, one or more SAN Ports 14A and one or more LAN Ports 15A. CPU can be in the form of one or more physical processors. CPU 11A executes one or more application programs that store data in Storage System 2A and use Memory 12A as working memory. Memory 12A may be dynamic random access memory (DRAM), non-volatile memory (NVM) or any other random access memory device. Storage Device 13A may be a hard disk drive (HDD), solid state drive (SSD) or any other permanent storage device. SAN Port 14A connects Server 1A to SAN 3A. LAN Port 15A connects Server 1A to LAN 4. CPU 11A may be configured to process a replication request from a user for one or more database tables stored in the storage volumes of Storage System 2A and determine the device identifiers and the address ranges based on locations of the one or more database tables in the storage volumes of Storage System 2A as illustrated, for example, in FIG. 8.

Figure 8:
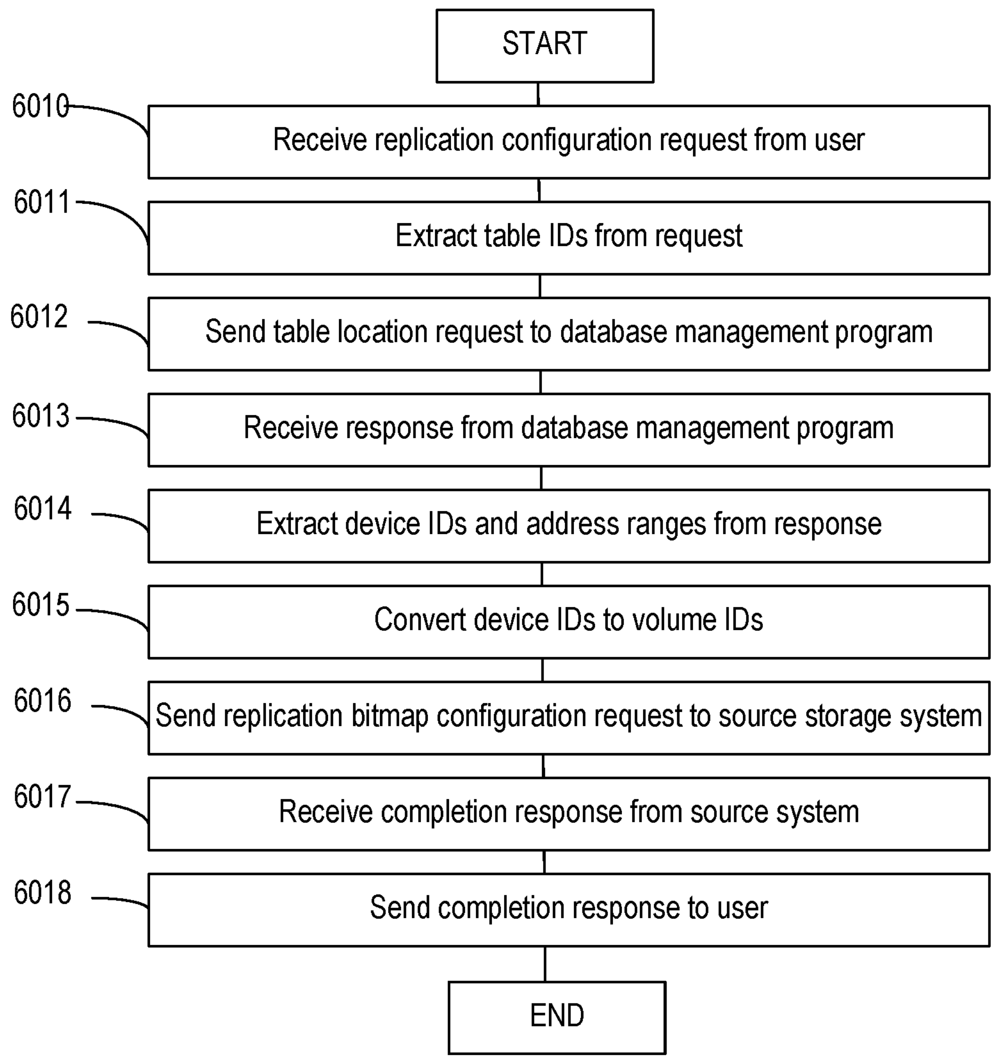
FIG. 8 illustrates a flow chart of a Replication Configuration by Storage Management Program, in accordance with an example implementation.
Figure 9:
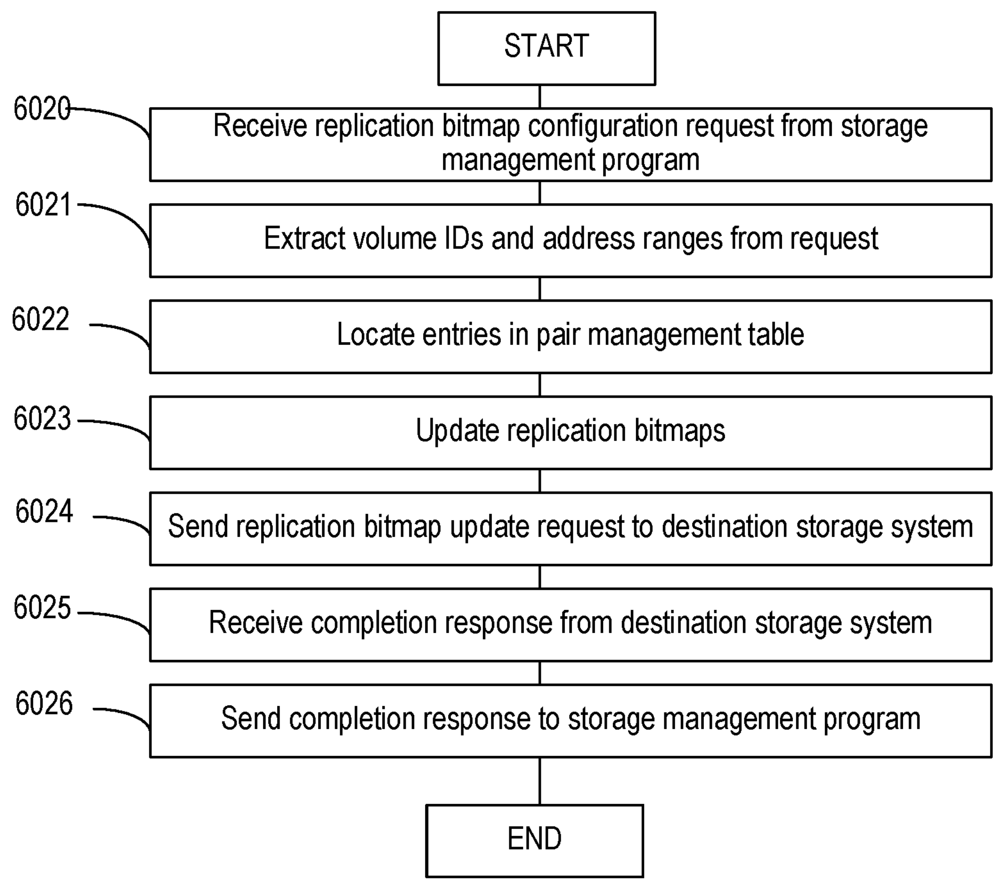
FIG. 9 illustrates a flow chart of a Replication Bitmap Configuration by Replication Management Program, in accordance with an example implementation.
Figure 23:
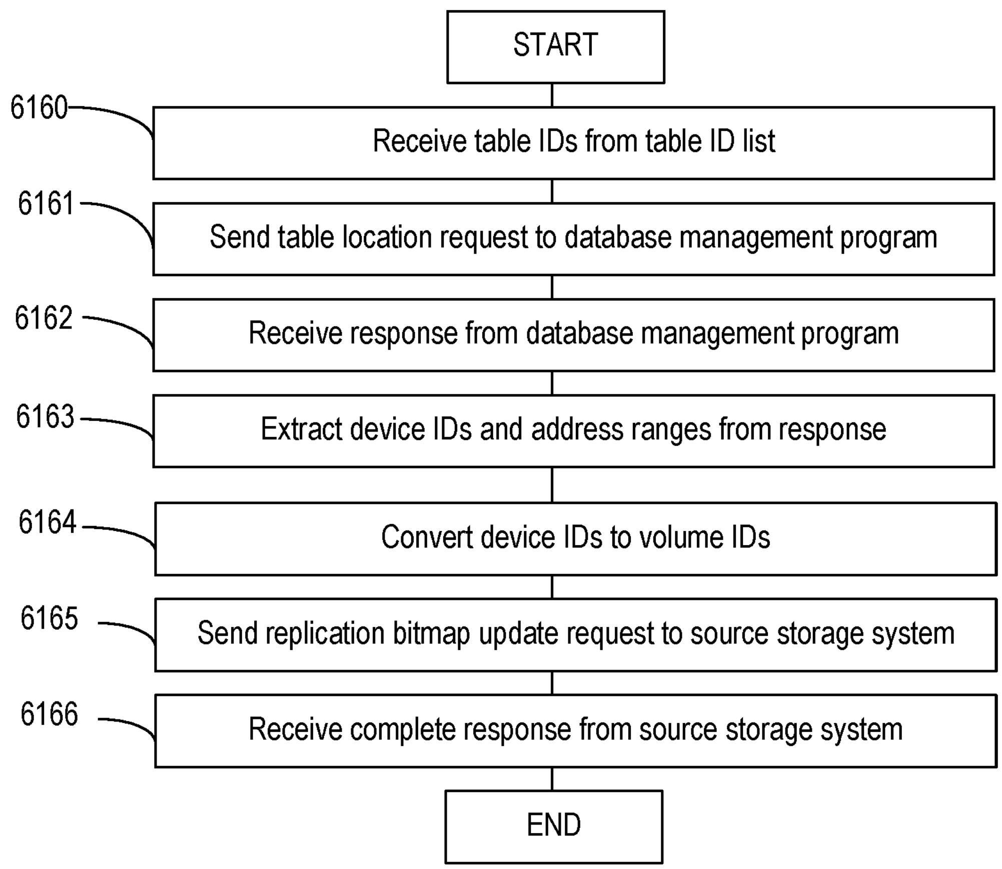
FIG. 23 illustrates the flow chart of the Replication Bitmap Update by Storage Management Program, in accordance with an example implementation.

CPU 11A may be configured to determine volume identifiers for storage volumes of Storage System 1A from the device identifiers, identify, from the volume identifiers, a first source volume from the storage volumes of Storage System 2A to be replicated to a second target volume of a plurality of storage volumes of Storage System 2B, and issue a command to the first storage system to replicate the first volume to the second volume as illustrated in FIG. 8. CPU 11A is also configured to send a replication information update request to the Storage System 1A corresponding to the one or more of the storage volumes of Storage System 1A as illustrated in FIGS. 9 and 23.

Server 1B can involve one or more CPUs 11B, Memory 12B, one or more Storage Devices 13B, one or more SAN Ports 14B and one or more LAN Ports 15B. CPU 11B executes one or more application programs that store data in Storage System 2B and use Memory 12B as working memory. Memory 12B may be DRAM, NVM or any other random access memory device. Storage Device 13B may be a HDD, an SSD or any other permanent storage device. SAN Port 14B connects Server 1B to SAN 3B. LAN Port 15B connects Server 1B to LAN 4.

Storage System 2A can involve of one or more CPUs 21A, Memory 22A, one or more Storage Devices 23A, one or more SAN Ports 24A and one or more LAN Ports 25A. CPU 21A executes one or more programs that process I/O requests received from Server 1A, using a part of Memory 22A as working memory, and can be in the form of one or more physical processors. Memory 22A may be DRAM, NVM or any other random access memory device. Storage Device 23A may be a HDD, an SSD or any other permanent storage device. SAN Port 24A connects Storage System 2A to SAN 3A. LAN Port 25A connects Storage System 2A to LAN 4. Storage System 2A may manage a plurality of storage volumes, each of which involving a plurality of regions. CPUs 21A may be configured, for receipt of the command to replicate the first source volume to the second target volume store replication information configured by the Server 1A in the memory 22A, wherein the replication information is indicative of, for each of the plurality of regions of the first source volume, whether the each of the plurality of regions is replicable to the second target volume or not replicable to the second volume as illustrated, for example, in FIG. 6, and replicate, to the second target volume, first ones of the plurality of regions of the first source volume indicated as replicable to the second volume by the replication information as illustrated, for example, in FIG. 11. In example implementations, permission information may also be provided of whether the each of the plurality of regions is permitted to be replicated or not permitted to be replicated as illustrated in FIG. 15, and only regions that are permitted to be replicated can be configured to be replicable in accordance with FIG. 19. CPUs 21A may also be configured to update the replication information for the one or more of the storage volumes in response to the replication information update request from Server 1A as illustrated, for example, in FIGS. 9 and 24.

Figure 6:
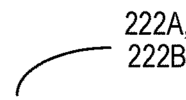
FIG. 6 illustrates the logical layouts of Pair Management Tables, in accordance with an example implementation.
Figure 11:
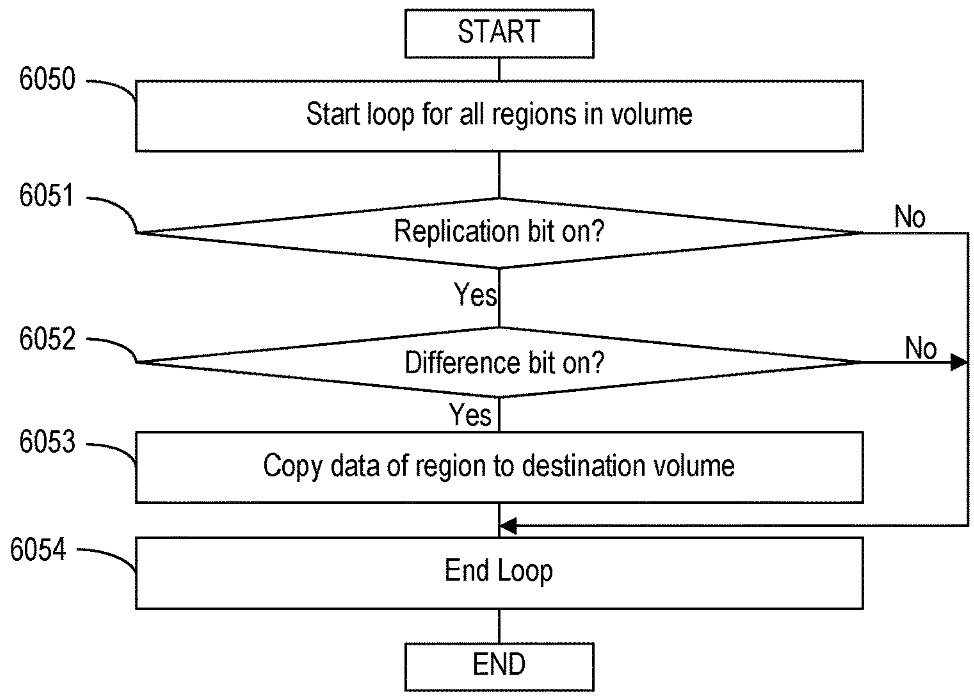
FIG. 11 illustrates a flow chart of the Data Copy by Replication Management Program, in accordance with an example implementation.

Memory 22A can be configured to store difference information indicative of differences between the plurality of regions of the first source volume and the second target volume as illustrated in FIG. 6. CPU 21A can configured to replicate, to the second target volume, second ones of the plurality of regions of the first source volume indicated as being different by the difference information as illustrated in FIG. 11.

Storage System 2B can involve one or more CPUs 21B, Memory 22B, one or more Storage Devices 23B, one or more SAN Ports 24B and one or more LAN Ports 25B. Storage System 2B functions the same way as Storage System 2A, except for two differences. One difference is that CPU 21B executes programs that process input/output (I/O) requests received from Server 1B instead of from Server 1A. The other difference is that SAN Port 24B connects Storage System 2B to SAN 3B instead of to SAN 3A.

Each of SAN 3A, SAN 3B and SAN 3C is an Ethernet network, a Fibre Channel network, or any other network which can be used to send I/O requests. Server 1A uses SAN 3A to send I/O requests to Storage System 2A. Server 1B uses SAN 3B to send I/O requests to Storage System 2B. I/O requests include read requests and write requests. Storage System 2A uses SAN 3C to replicate data to Storage System 2B.

LAN 4 is an Ethernet network or any other network which can be used to send management requests. Server 1A uses LAN 4 to send management requests to Storage System 2A. Server 1B uses LAN 4 to send management requests to Storage System 2A and to Storage System 2B. Management requests include requests for managing data replication between Storage System 2A and Storage System 2B.

Figure 2:
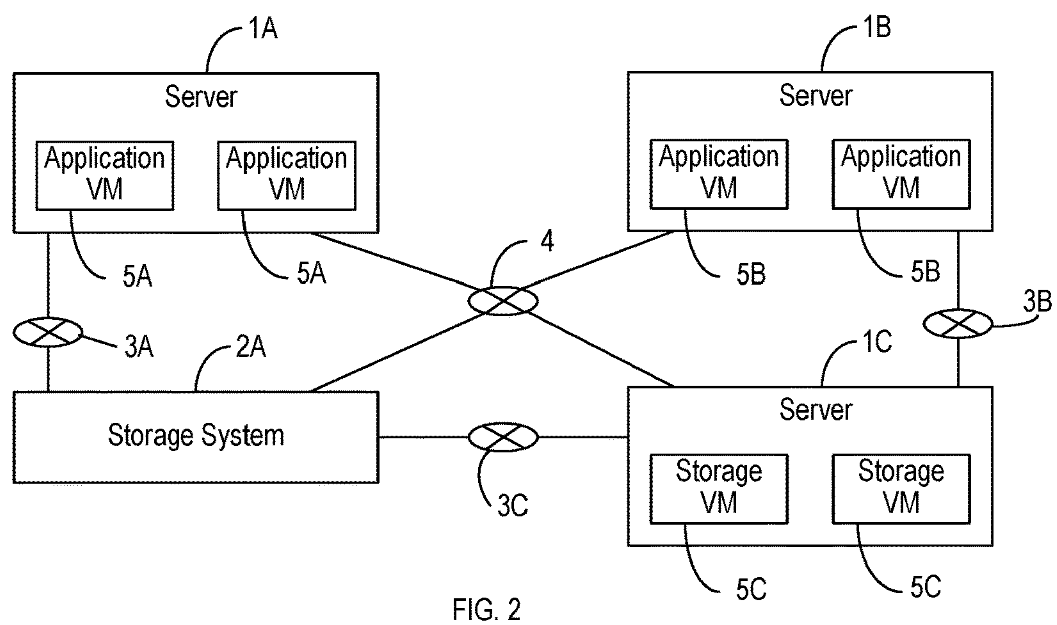
FIG. 2 illustrates an alternative configuration of the system in which the method and apparatus of example implementations may be applied.

FIG. 2 illustrates an alternative configuration of the system in which the method and apparatus of example implementations may be applied. The physical configuration is essentially the same as the physical configuration in FIG. 1, except Storage System 2B is replaced by one or more Servers 1C.

Server 1A executes one or more Application virtual machines (VMs) 5A. Application VM 5A is a virtual machine that uses a part of the resources of Server 1A to execute programs. Application VM 5A logically functions the same way as Server 1A in FIG. 1, executing one or more application programs that store data in Storage System 2A.

Server 1B executes one or more Application VMs 5B. Application VM 5B is a virtual machine that uses a part of the resources of Server 1B to execute programs. Application VM 5B logically functions the same way as Server 1B in FIG. 1, executing one or more application programs that store data in Storage System 2B.

Server 1C has the same physical configuration as Server 1A. Server 1B executes one or more Storage VMs 5C. Storage VM 5C logically functions the same way as Storage System 2B in FIG. 1, processing I/O requests received from Application VM 5B. Multiple Storage VMs 5C, running on one Server 1C or on multiple Servers 1C, may collectively function the same way as Storage System 2B in FIG. 1.

In another alternative configuration, Storage System 2A is replaced by one or more servers that run one or more virtual machines. The one or more virtual machines logically function the same way as Storage System 2A in FIG. 1 processing I/O requests received from Application VM 5A.

In yet another alternative configuration, Application VM 5B runs on Server 1C instead of Server 1B. In this configuration, Application VM 5B sends I/O requests to Storage VM 5C using the internal network of Server 1C instead of SAN 3B.

Figure 3:
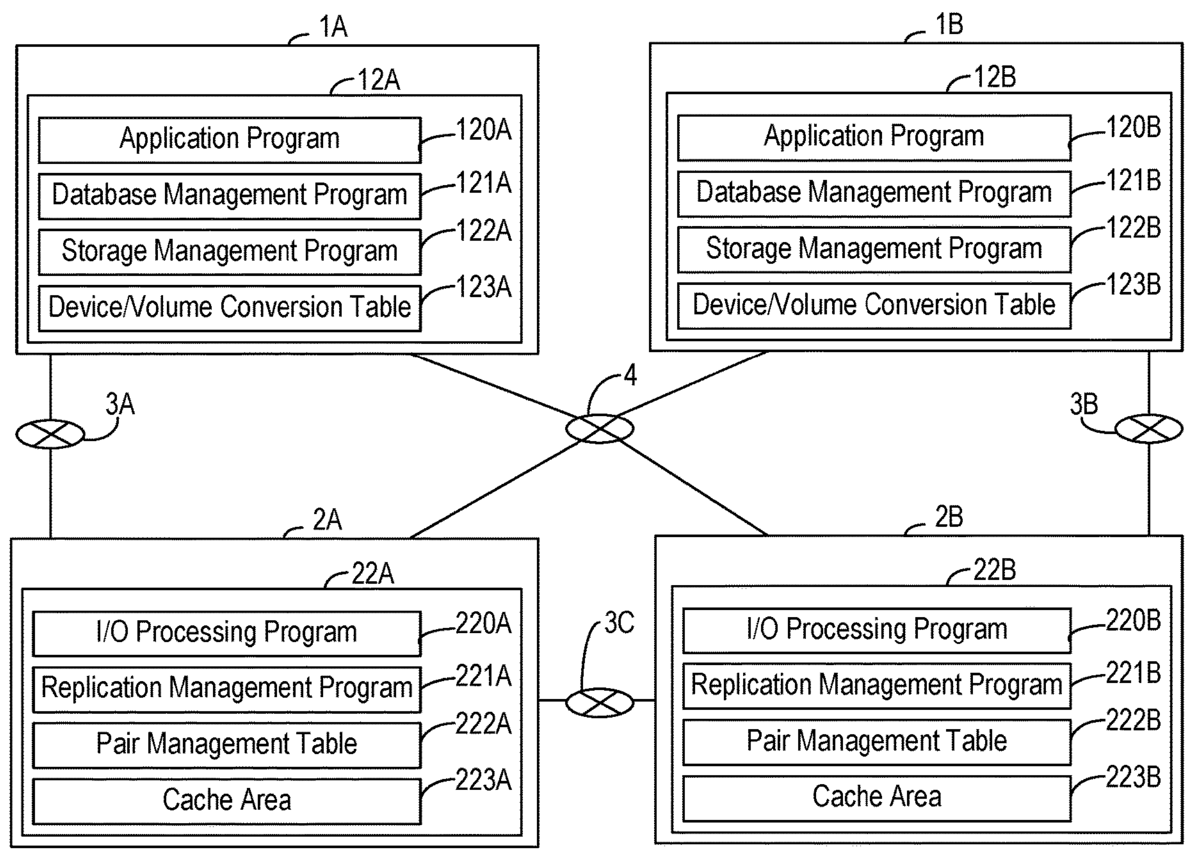
FIG. 3 illustrates the logical memory layouts, in accordance with an example implementation.

FIG. 3 illustrates the logical layouts of Memory 12A, Memory 12B, Memory 22A and Memory 22B, in accordance with an example implementation. Memory 12A contains Application Program 120A, Database Management Program 121A, Storage Management Program 122A and Device/Volume Conversion Table 123A. Database Management Program 121A provides a transactional database to Application Program 120A. Application Program 120A loads data from and stores data in tables provided by Database Management Program 121A. Database Management Program 121A loads table data from and stores table data in Storage System 2A by sending read requests and write requests to Storage System 2A.

Storage Management Program 122A manages Storage System 2A. Storage Management Program 122A may run on the same Server 1A as Database Management Program 121A or on a different Server 1A as Database Management Program 121A. Memory 12B contains Application Program 120B, Database Management Program 121B, Storage Management Program 122B and Device/Volume Conversion Table 123B. Database Management Program 121B provides a transactional database to Application Program 120B. Application Program 120B loads data from and store data in tables provided by Database Management Program 121B. Database Management Program 121B loads table data from and stores table data in Storage System 2B by sending read requests and write requests to Storage System 2B.

Storage Management Program 122B manages Storage System 2A and Storage System 2B. Storage Management Program 122B may run on the same Server 1B as Database Management Program 121B or on a different Server 1B as Database Management Program 121B. Memory 22A contains I/O Processing Program 220A, Replication Management Program 221A, Pair Management Table 222A and Cache Area 223A. I/O Processing Program 220A is executed by CPU 21A when Storage System 2A receives an I/O request from Server 1A. Cache Area 223A is used by I/O Processing Program 220A to temporarily store data being read from or written to Storage Device 23A. Replication Management Program 222A is executed by CPU 21A when Storage System 2A receives a replication management request from Server 1A or Server 1B.

Memory 22B contains I/O Processing Program 220B, Replication Management Program 221B, Pair Management Table 222B and Cache Area 223B. I/O Processing Program 220B is executed by CPU 21B when Storage System 2B receives an I/O request from Server 1B. Cache Area 223B is used by I/O Processing Program 220B to temporarily store data being read from or written to Storage Device 23B. Replication Management Program 221B is executed by CPU 21B when Storage System 2B receives a replication management request from Server 1B.

Figures 4, 5:
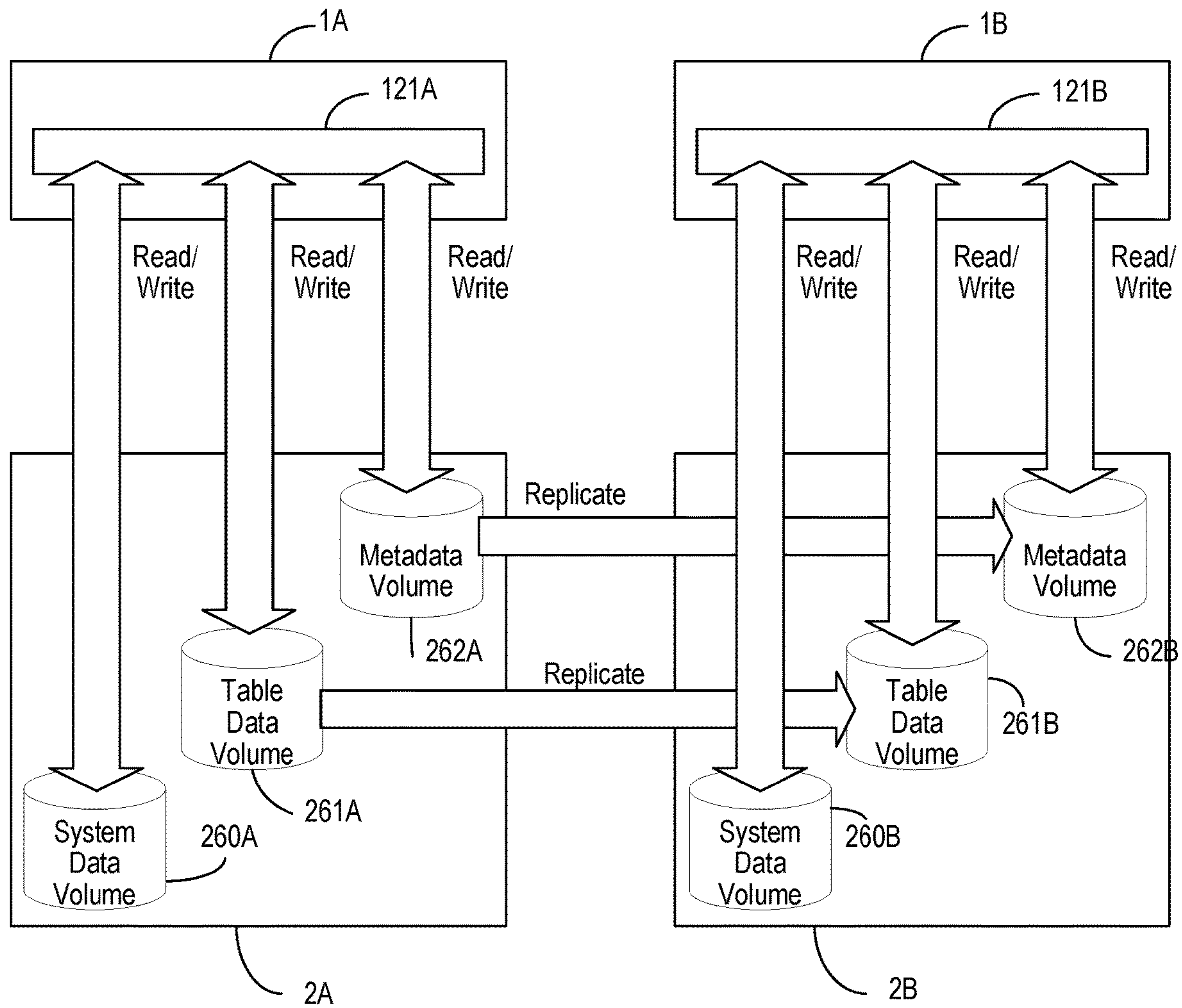
FIG. 4 illustrates a data flow overview, in accordance with an example implementation.
FIG. 5 illustrates the logical layouts of Device/Volume Conversion Tables, in accordance with an example implementation.

FIG. 4 illustrates a data flow overview, in accordance with an example implementation. Database Management Program 121A uses data stored in one or more System Data Volumes 260A, one or more Metadata Volumes 261A and one or more Table Data Volumes 262A provided by Storage System 1A. Storage System 1A stores data written to System Data Volume 260A, Table Data Volume 261A and Metadata Volume 262A in Storage Device 23A. Database Management Program 121A stores system data in System Data Volume 260A. The system data includes information such as user IDs and passwords for logging in to the database, parameters for controlling the size of the database, and parameters for controlling the performance of the database.

Database Management Program 121A stores its table data in Table Data Volume 261A. Each Table Data Volume 261A may hold the data for one table or for multiple tables. The data for one table may be distributed across multiple Table Data Volumes 261A. Database Management Program 121A stores metadata for the table data stored in Table Data Volume 261A in Metadata Volume 262A. The metadata includes, for example, the location of each table within Table Data Volume 261A.

Instead of using separate volumes for table data and metadata, Database Management Program 121A may store both table data and metadata in Table Data Volume 261A. Database Management Program 121A may use one or more additional volumes provided by Storage System 1A to store transaction log data of the database. Database Management Program 121A uses the transaction log data to roll back or roll forward transactions. Instead of using additional volumes for transaction log data, Database Management Program 121A may store transaction log data in Table Data Volume 261A or Metadata Volume 262A.

Database Management Program 121A may store system data in Storage Device 13A instead of in Storage System 1A. Database Management Program 121B uses data stored in one or more System Data Volumes 260B, one or more Metadata Volumes 261B and one or more Table Data Volumes 262B provided by Storage System 1B. Storage System 1B stores data written to System Data Volume 260B, Table Data Volume 261B and Metadata Volume 262B in Storage Device 23B.

Database Management Program 121B stores its system data in System Data Volume 260B. The system data contains the same kind of information as the system data stored in System Data Volume 260A. However, the information stored in System Data Volume 260A and in System Data Volume 260B may be different. For example, Database Management Program 121A and Database Management Program 121B may be used by different users, resulting in user IDs and passwords for different users being stored in System Data Volume 260A and System Data Volume 260B.

Database Management Program 121B stores its table data in Table Data Volume 261B. Data replication functionality on Storage System 2A and Storage System 2B replicates data from Table Data Volume 261A to Table Data Volume 261B, making all or a part of the data stored in Table Data Volume 261A available in Table Data Volume 261B. Storage System 2B may allocate capacity from Storage Device 23B to Table Data Volume 261B on demand. By allocating capacity on demand, capacity used on Storage Device 23B is limited to the size of the data that is replicated from Table Data Volume 261A to Table Data Volume 261B.

Database Management Program 121B stores metadata for the table data stored in Table Data Volume 261B in Metadata Volume 262B. Data replication functionality on Storage System 2A and Storage System 2B replicates data from Metadata Volume 262A to Metadata Volume 262B, making all or a part of the data stored in Metadata Volume 262A available in Metadata Volume 262B.

FIG. 5 illustrates the logical layouts of Device/Volume Conversion Tables 123A and Device/Volume Conversion Table 123B, in accordance with an example implementation. Device/Volume Conversion Table 123A is used by Storage Management Program 122A to convert the ID of a device managed by Server 1A to the ID of the corresponding volume in Storage System 2A. Device/Volume Conversion Table 123A can include multiple entries, each corresponding to a device recognized by Server 1A. Each entry can include Device ID 1230A, Storage System ID 1231A and Volume ID 1232A. Device ID 1230A is used to identify a device managed by Server 1A. Example values of Device ID 1230A are "/dev/sda" and "/dev/sdb".

Storage System ID 1231A is used to identify the storage system that provides the volume recognized by Server 1A as the device identified by Device ID 1230A. Example values of Storage System ID 1231A are 0 and 1. Volume ID 1232A is used to identify the volume within the storage system identified by Storage System ID 1232A that is recognized by Server 1A as the device identified by Device ID 1230A. Example values of Volume ID 1232A are 100 and 200.

Device/Volume Conversion Table 123B is used by Storage Management Program 122B to convert the ID of a device managed by Server 1B to the ID of the corresponding volume in Storage System 2A or Storage System 2B. The logical layout of Device/Volume Conversion Table 123B is essentially the same as that of Device/Volume Conversion Table 123A except Device ID 1230B is used to identify a device managed by Server 1B instead of Server 1A.

FIG. 6 illustrates the logical layouts of Pair Management Table 222A and Pair Management Table 222B. Pair Management Table 222A is used by Replication Management Program 221A to manage and control replication from a source volume provided by Storage System 2A to a destination volume provided by Storage System 2B. Pair Management Table 222A can include multiple entries, each corresponding to a replication pair. A replication pair is a pair of volumes between which data is replicated. Each entry can include Pair ID 2220A, Volume Type 2221A, Remote System ID 2222A, Source Volume ID 2223A, Destination Volume ID 2224A, Pair State 2225A, Replication Bitmap 2226A, Difference Bitmap 2227A and Bandwidth Limitation 2228A. Pair ID 2220A is used to identify a replication pair internally within Storage System 2A. Example values of Pair ID 2231A are 0, 1, 2 and 3.

Volume Type 2221A is used to identify whether the volume of the replication pair that is provided by Storage System 2A is the source or the destination of the replication. Example values of Volume Type 2232A are "Source" and "Destination". "Source" denotes that the volume is the source, and "Destination" denotes that the volume is the destination. Remote System ID 2222A is used to identify Storage System 2B. Example values of Remote System ID 2222A are 0, 1 and 2.

Source Volume ID 2223A is used to identify the source volume of the replication within the source storage system. Example values of Source Volume ID 2223A are 100, 200, 300 and 400. Destination Volume ID 2224A is used to identify the destination volume of the replication within the destination storage system. Example values of Destination Volume ID are 100 and 200. Pair State 2225A is used to manage the state of the replication pair and to control the processing of I/O requests. Example values of Pair State 2236A are "SMPL", "COPY", "PAIR" and "SUSP". "SMPL" denotes that the replication pair has been defined but that no data has been replicated yet. "COPY" denotes that the replication pair is in the process of being synchronized. "PAIR" denotes that the replication pair is synchronized. "SUSP" denotes that the replication pair is suspended.

Replication Bitmap 2226A is used to manage the regions of the source volume that are to be replicated to the destination volume. Replication Bitmap 2237A stores information for each region of the source volume. The size of each region is, for example, 256 kilobytes (KB) or 42 megabytes (MB). Example values for the information stored for each region are "On" and "Off". "On" denotes that the region is to be replicated, and "Off" denotes that the region is not to be replicated.

Difference Bitmap 2227A is used to manage the regions of the source volume which are not synchronized with the destination volume. Difference Bitmap 2227A stores information for each region of the source volume. The size of each region is, for example, 256 KB or 42 MB. Example values for the information stored for each region are "On" and "Off". "On" denotes that the region is not synchronized, and "Off" denotes that the region is synchronized.

Bandwidth Limitation 2228A is used to limit the rate which data is replicated from the source volume to the target volume. Example values of Bandwidth Limitation 2228A are "None", "10%", "1 MB/sec" and "10 MB/sec". "None" denotes that there is no limit. "10%" denotes that the limit is 10% of the maximum rate. "1 MB/sec" and "10 MB/sec" denote that the limits are 1 MB/sec and 10 MB/sec, respectively.

Pair Management Table 222B is used by Replication Management Program 221B to manage and control replication from a source volume provided by Storage System 2A to a destination volume provided by Storage System 2B. The logical layout of Pair Management Table 222B is essentially the same as Pair Management Table 222A except for the following differences: Pair ID 2220B is used to identify a replication pair internally within Storage System 2B instead of Storage System 2A; Volume Type 2221B is used to identify whether the volume of the replication pair that is provided by Storage System 2B instead of Storage System 2A is the source or the destination of the replication; and Remote System ID 2222B is used to identify Storage System 2A instead of Storage System 2B.

Figure 7:
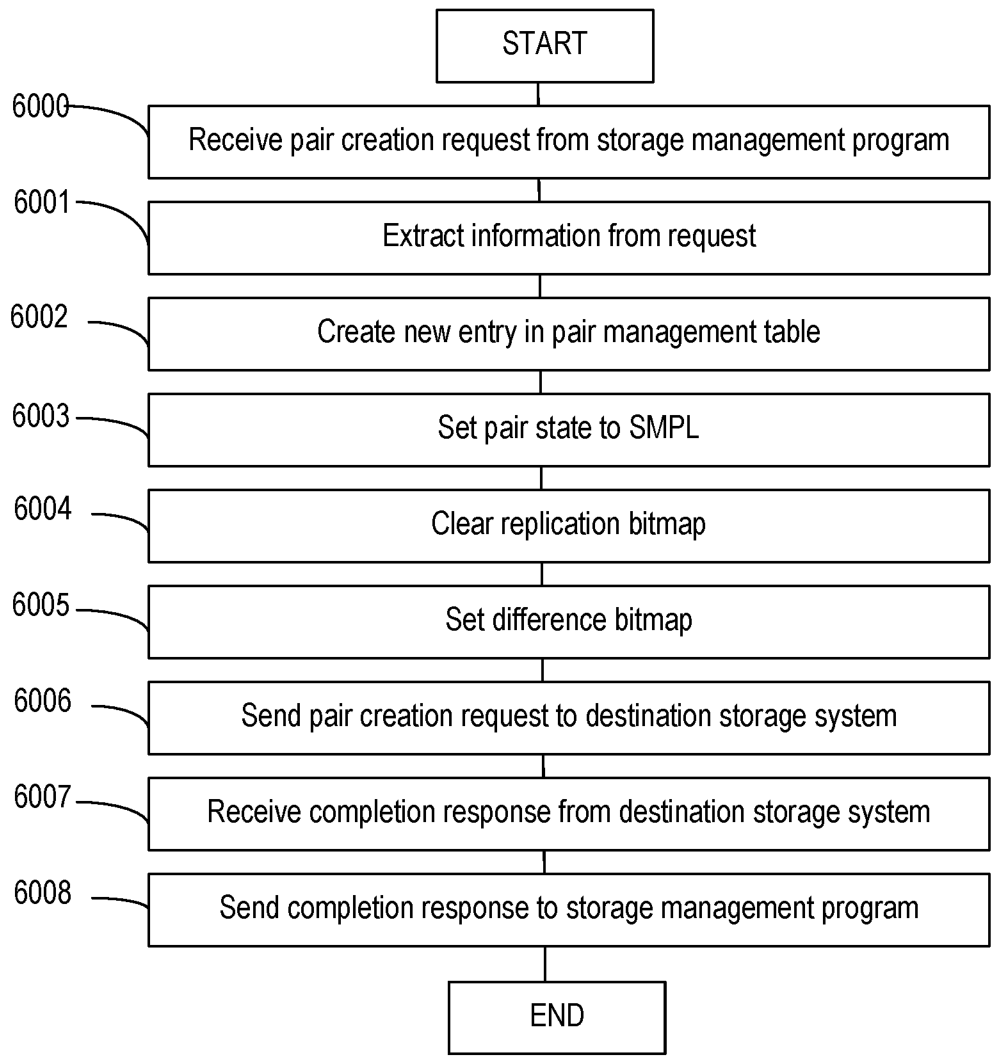
FIG. 7 illustrates a flow chart of a Pair Creation by Replication Management Program, in accordance with an example implementation.

FIG. 7 illustrates a flow chart of Pair Creation by Replication Management Program 221A, in accordance with an example implementation. Specifically, FIG. 7 shows the flow of pair creation executed by Replication Management Program 221A when Storage System 2A receives a pair creation request from Storage Management Program 122A. The pair creation request contains the ID of Storage System 2B as the ID of the destination storage system, the ID of Table Data Volume 261A as the ID of the source volume, and the ID of Table Data Volume 261B as the ID of the destination volume. The pair creation request may also contain a parameter designating whether or not and by how much the rate of replication should be limited.

Two or more Table Data Volumes 261A may be replicated to the same number of Table Data Volumes 261B. In this case, Storage Management Program 122A sends a pair creation request corresponding to each pair of Table Data Volume 261A and corresponding Table Data Volume 261B, and Replication Management Program 221A executes the flow shown in FIG. 10 for each pair creation request.

At 6000, the Replication Management Program 221A receives the pair creation request from Storage Management Program 122A. At 6001, the Replication Management Program 221A extracts the ID of the destination storage system, the ID of the source volume, and the ID of the destination volume from the pair creation request. Replication Management Program 221A may also extract the parameter designating whether or not and by how much the rate of replication should be limited. At 6002, the Replication Management Program 221A creates a new entry in Pair Management Table 222A. Replication Management Program 221A sets Pair ID 2220A of the new entry to a value not used by Pair ID 2220A of any other entry in Pair Management Table 222A. Replication Management Program 221A sets Volume Type 2221A of the new entry to "Source". Replication Management Program 221A sets Remote System ID 222A of the new entry to the ID of the destination storage system extracted at 6001. Replication Management Program 221A sets Source Volume ID 2224A of the new entry to the ID of the source volume extracted at 6001. Replication Management Program 221A sets Destination Volume ID 2224A of the new entry to the ID of the destination volume extracted at 6001. Replication Management Program 221A sets Bandwidth Limitation 2228A of the new entry to the parameter designating whether or not and by how much the rate of replication should be limited extracted at 6001.

At 6003, the Replication Management Program 221A sets Pair State 2225A of the new entry created at 6002 to "SMPL". At 6004, the Replication Management Program 221A clears Replication Bitmap 2226A of the new entry created at 6002 by setting the information corresponding to each region to "Off". At 6005, the Replication Management Program 221A sets Difference Bitmap 2227A of the new entry created in Step 6002 by setting the information corresponding to each region to "On".

At 6006, the Replication Management Program 221A sends a pair creation request to Storage System 2B. Replication Management Program 221A includes in the pair creation request the ID of Storage System 2A, the ID of the source volume, and the ID of the destination volume. Replication Management Program 221A may also include in the pair creation request the parameter designating whether or not and by how much the rate of replication should be limited. When Storage System 2B receives the pair creation request, Replication Management Program 221B updates Pair Management Table 222B by creating a new entry. Storage System 2B then sends a completion response indicating the completion of pair creation to Storage System 2A.

At 6007, the Replication Management Program 221A receives the completion response indicating the completion of pair creation from Storage System 2B. At 6008, the Replication Management Program 221A sends a completion response indicating the completion of pair creation to Storage Management Program 122A.

FIG. 8 illustrates a flow chart of Replication Configuration by Storage Management Program 122A, in accordance with an example implementation. Specifically, FIG. 8 shows the flow of replication configuration executed by Storage Management Program 122A when Server 1A receives a replication configuration request from a user or a program written by the user. The replication configuration request contains the IDs of the tables that are to be replicated from Storage System 2A to Storage System 2B.

At 6010, the Storage Management Program 122A receives the replication configuration request from the user. At 6011, the Storage Management Program 122A extracts the tables IDs from the replication configuration request. At 6012, the Storage Management Program 122A sends a table location request to Database Management Program 121A. The table location request contains the table IDs extracted in Step 6011. When Database Management Program 121A receives the table location request, Database Management Program 121A sends a response to the table location request to Storage Management Program 122A. The response contains the locations of the tables corresponding to the IDs contained in the table location request. Each location is, for example, the ID of a device managed by Server 1A and the address range specifying a region within the device.

At 6013, the Storage Management Program 122A receives the response to the table location request from Database Management Program 121A. At 6014, the Storage Management Program 122A extracts the device IDs and the address ranges from the response to the table location request. At 6015, the Storage Management Program 122A converts each device ID extracted at 6014 to an ID that is used to identify volumes within Storage System 2A by looking up Device/Volume Conversion Table 123A.

At 6016, the Storage Management Program 122A sends a replication bitmap configuration request to Storage System 2A. The replication bitmap configuration request contains the volume IDs obtained at 6015 and the address ranges extracted at 6014. Instead of volume IDs, the replication bitmap configuration request may contain the IDs of the replication pairs applied to the volumes. Instead of address ranges, the replication bitmap configuration request may contain bitmaps. The bitmaps are created by Storage Management Program 122A from the address ranges extracted in at 6014. Each bit in the bitmaps corresponds to a bit in Replication Bitmap 2226A. When Storage System 2A receives the replication bitmap configuration request, Storage System 2A executes the flow shown in FIG. 9.

At 6017, the Storage Management Program 122A receives a completion response indicating the completion of replication bitmap configuration from Storage System 2A. At 6018, the Storage Management Program 122A sends a completion response indicating the completion of replication configuration to the user or the program written by the user.

FIG. 9 illustrates a flow chart of Replication Bitmap Configuration by Replication Management Program 221A, in accordance with an example implementation. Specifically, FIG. 9 shows the flow of replication bitmap configuration executed by Replication Management Program 221A when Storage System 2A receives the replication bitmap configuration request sent by Storage Management Program 221A at 6016.

At 6020, the Replication Management Program 221A receives the replication bitmap configuration request from Storage Management Program 122A. At 6021, the Replication Management Program 221A extracts the volume IDs or pair IDs and the address ranges or bitmaps from the replication bitmap configuration request. At 6022, the Replication Management Program 221A locates the entry in Pair Management Table 222A corresponding to each volume ID or pair ID extracted at 6021. In order to locate each entry, Replication Management Program 221A searches Pair Management Table 222A for the entry whose Source Volume ID 2223A is equal to the extracted volume ID or whose Pair ID 2220A is equal to the extracted pair ID.

At 6023, the Replication Management Program 221A updates Replication Bitmap 2226A of each entry located in Step 6022 by setting the information corresponding to the address range extracted at 6021 to "On". If bitmaps instead of address ranges were extracted at 6021, Replication Management Program 221A updates Replication Bitmap 2226A of each entry located at 6022 by copying the bitmap extracted at 6021 to Replication Bitmap 2226A.

At 6024, the Replication Management Program 221A sends a replication bitmap update request to Storage System 2B. For each entry located at 6022, the replication bitmap update request contains Source Volume ID 2223A and Replication Bitmap 2226A of the located entry. When Storage System 2B receives the replication bitmap update request, Replication Management Program 221B updates Pair Management Table 222B by locating the entry corresponding to the ID of the source volume contained in the replication bitmap update request and updating Replication Bitmap 2226B of the located entry. Replication Management Program 221B then sends a completion response indicating completion of replication bitmap update to Storage System 2A.

At 6025, the Replication Management Program 221A receives the completion response indicating completion of replication bitmap update from Storage system 2B. At 6026, the Replication Management Program 221A sends a completion response indicating completion of replication bitmap configuration to Storage Management Program 122A.

Figure 10:
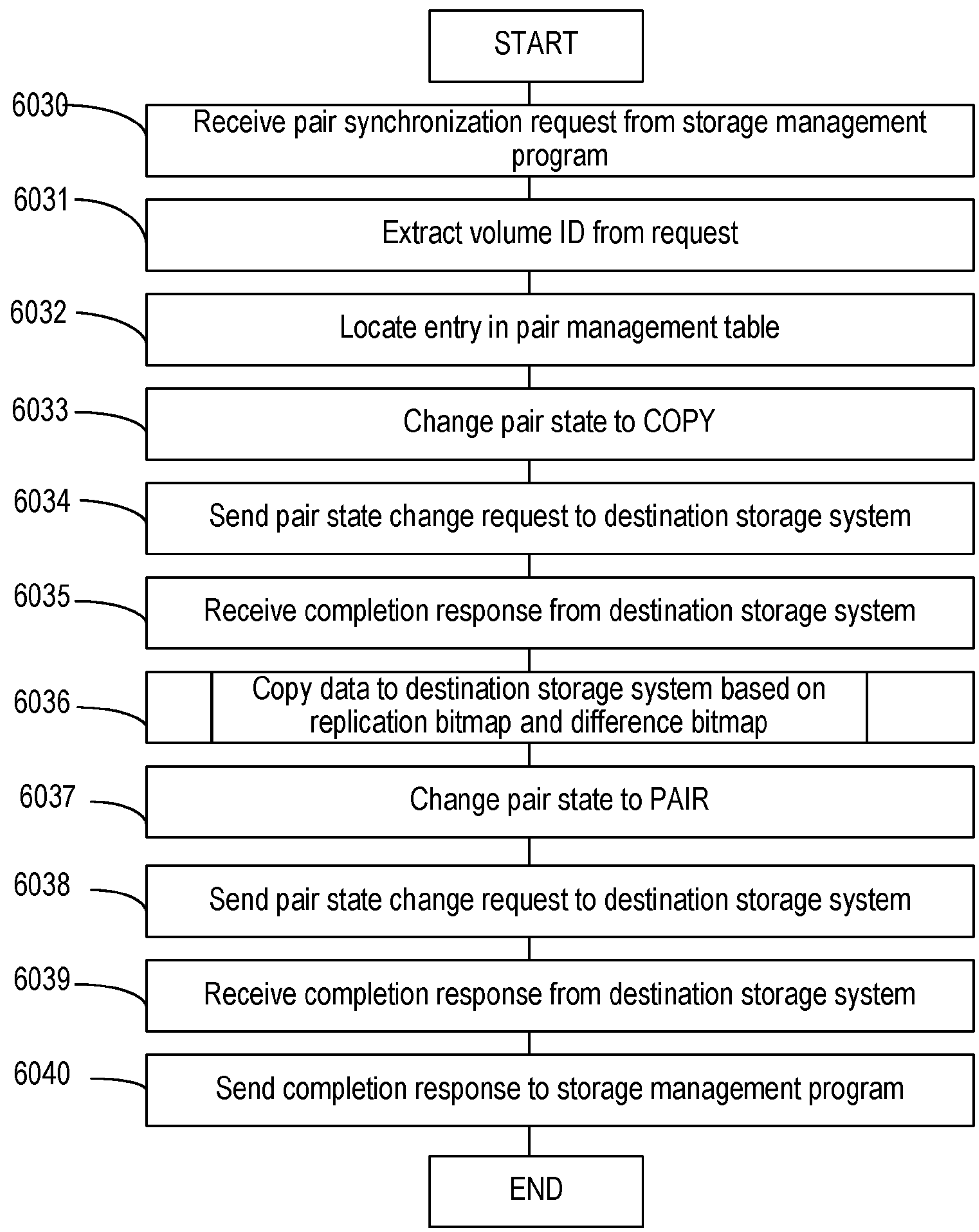
FIG. 10 illustrates a flow chart of a Pair Synchronization by Replication Management Program, in accordance with an example implementation.

FIG. 10 illustrates a flow chart of Pair Synchronization by Replication Management Program 221A, in accordance with an example implementation. Specifically, FIG. 10 shows the flow of pair synchronization executed by Replication Management Program 221A when Storage System 2A receives a pair synchronization request from Storage Management Program 122A. The pair synchronization request contains the ID of the source volume of the replication pair to be synchronized. The pair synchronization request may contain the ID of the replication pair to be synchronized instead of the ID of the source volume. Storage Management Program 122A may send the pair synchronization request in order to perform an initial synchronization of the replication pair after pair creation or to perform a resynchronization of the replication pair after pair suspension.

At 6030, the Replication Management Program 221A receives the pair synchronization request from Storage Management Program 122A. At 6031, the Replication Management Program 221A extracts the volume ID or the pair ID from the pair synchronization request. At 6032, the Replication Management Program 221A locates the entry in Pair Management Table 222A corresponding to the volume ID or the pair ID extracted at 6031. In order to locate the entry, Replication Management Program 221A searches Pair Management Table 222A for the entry whose Source Volume ID 2223A is equal to the extracted volume ID or whose Pair ID 2220A is equal to the extracted pair ID.

At 6033, the Replication Management Program 221A sets Pair State 2225A of the entry located at 6032 to "COPY". At 6034, the Replication Management Program 221A sends a pair state change request to Storage System 2B. The pair state change request includes Source Volume ID 2223A of the entry located at 6032. When Storage System 2B receives the pair state change request, Replication Management Program 221B updates Pair Management Table 222B by locating the entry corresponding to the ID of the source volume contained in the pair state change request and changing Pair State 2225B of the entry to "COPY". Replication Management Program 221B then sends a completion response indicating completion of pair state change to Storage System 2A.

At 6035, the Replication Management Program 221A receives the completion response indicating the completion of pair state change from Storage system 2B. At 6036, the Replication Management Program 221A copies data to Storage System 2B based on Replication Bitmap 2226A and Difference Bitmap 2227A by executing the flow shown in FIG. 11. At 6037, the Replication Management Program 221A sets Pair State 2225A of the entry located at 6032 to "PAIR".

At 6038, the Replication Management Program 221A sends a pair state change request to Storage System 2B. The pair state change request includes Source Volume ID 2223A of the entry located in at 6032. When Storage System 2B receives the pair state change request, Replication Management Program 221B updates Pair Management Table 222B by locating the entry corresponding to the ID of the source volume contained in the pair state change request and changing Pair State 2225B of the entry to "PAIR". Replication Management Program 221B then sends a completion response indicating completion of pair state change to Storage System 2A.

At 6039, the Replication Management Program 221A receives the completion response indicating the completion of pair state change from Storage system 2B. At 6040, the Replication Management Program 221A sends a completion response indicating completion of pair synchronization to Storage Management Program 122A.

FIG. 11 illustrates a flow chart of the Data Copy by Replication Management Program 221A, in accordance with an example implementation. Specifically, FIG. 11 illustrates the flow of data copy executed by Replication Management Program 221A. This flow corresponds to the flow of 6036 from FIG. 10.

At 6050, the Replication Management Program 221A starts a loop that executes the flow from 6051 through 6053 for each region of the volume identified by Source Volume ID 2223A of the entry located in the flow at 6032. At 6051, the Replication Management Program 221A determines whether the region is to be copied or not. In order to make this determination, Replication Management Program 221A references Replication Bitmap 2226A of the entry located at 6032 and determines whether the information corresponding to the region is equal to "On". If so (Yes) the flow proceeds to 6052, otherwise (No) the flow proceeds to 6054.

At 6052, the Replication Management Program 221A determines whether or not the volumes identified by Source Volume ID 2223A and Destination Volume ID 2224A of the entry located at 6032 have different data for the region. In order to make this determination, Replication Management Program 221A references Difference Bitmap 2227A of the entry located at 6032 and determines whether the information corresponding to the region is equal to "On". If so (Yes) the flow proceeds to 6053, otherwise (No) the flow proceeds to 6054.

At 6053, the Replication Management Program 221A copies the data of the region to the volume identified by Destination Volume ID 2224A of the entry located at 6032. At 6054, the Replication Management Program 221A ends the loop started at the flow at 6050.

Figure 12:
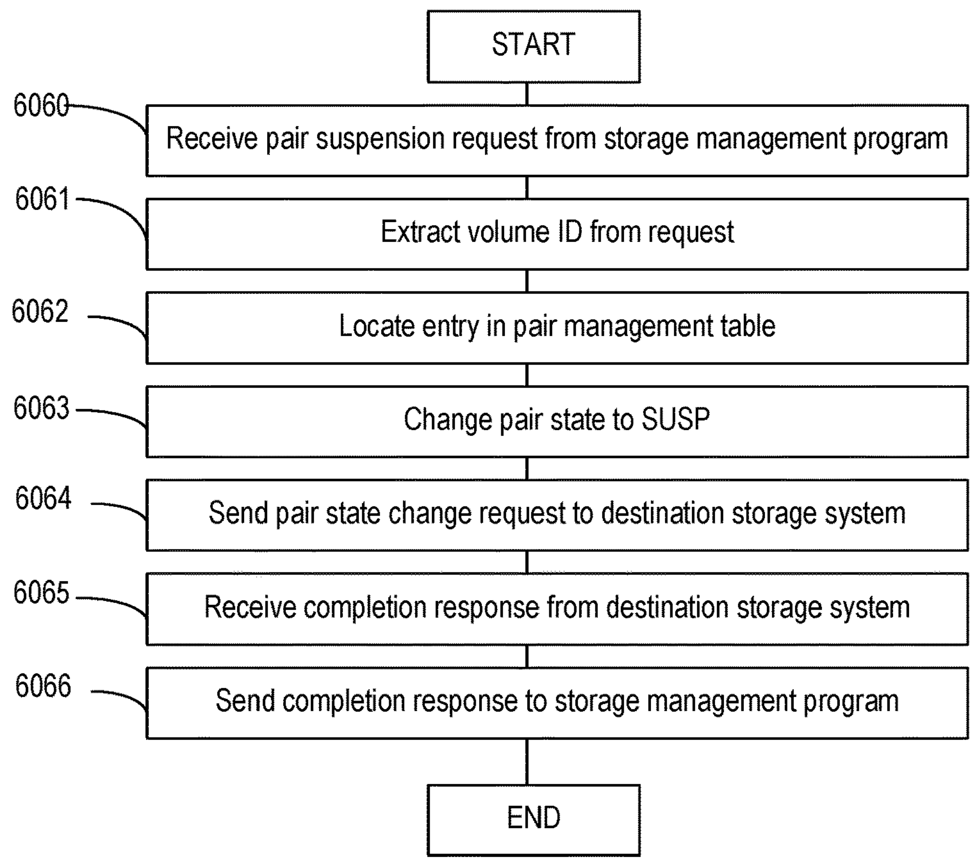
FIG. 12 illustrates a flow chart of a Pair Suspension by Replication Management Program, in accordance with an example implementation.

FIG. 12 illustrates a flow chart of Pair Suspension by Replication Management Program 221A, in accordance with an example implementation. Specifically, FIG. 12 shows the flow of pair suspension executed by Replication Management Program 221A when Storage System 2A receives a pair suspension request from Storage Management Program 122A. The pair suspension request contains the ID of the source volume of the replication pair to be suspended. The pair suspension request may contain the ID of the replication pair to be suspended instead of the ID of the source volume. Storage System 2A may receive the pair suspension request from Storage Management Program 122B or from Storage System 2B instead of from Storage Management Program 122A.

At 6060, the Replication Management Program 221A receives the pair suspension request from Storage Management Program 122A, Storage Management Program 122B or Storage System 2B. At 6061, the Replication Management Program 221A extracts the volume ID or the pair ID from the pair suspension request. At 6062, the Replication Management Program 221A locates the entry in Pair Management Table 222A corresponding to the volume ID or the pair ID extracted from 6061. In order to locate the entry, Replication Management Program 221A searches Pair Management Table 222A for the entry whose Source Volume ID 2223A is equal to the extracted volume ID or whose Pair ID 2220A is equal to the extracted pair ID. At 6063, the Replication Management Program 221A sets Pair State 2225A of the entry located in Step 6062 to "SUSP". At 6064, the Replication Management Program 221A sends a pair state change request to Storage System 2B. The pair state change request includes Source Volume ID 2223A of the entry located at 6062.

When Storage System 2B receives the pair state change request, Replication Management Program 221B updates Pair Management Table 222B by locating the entry corresponding to the ID of the source volume contained in the pair state change request and changing Pair State 2225B of the entry to "SUSP". Replication Management Program 221B then sends a completion response indicating completion of pair state change to Storage System 2A.

At 6065, the Replication Management Program 221A receives the completion response indicating the completion of pair state change from Storage system 2A. At 6066, the Replication Management Program 221A sends a completion response indicating completion of pair suspension to Storage Management Program 122A, Storage Management Program 122B or Storage System 2B.

Figure 13:
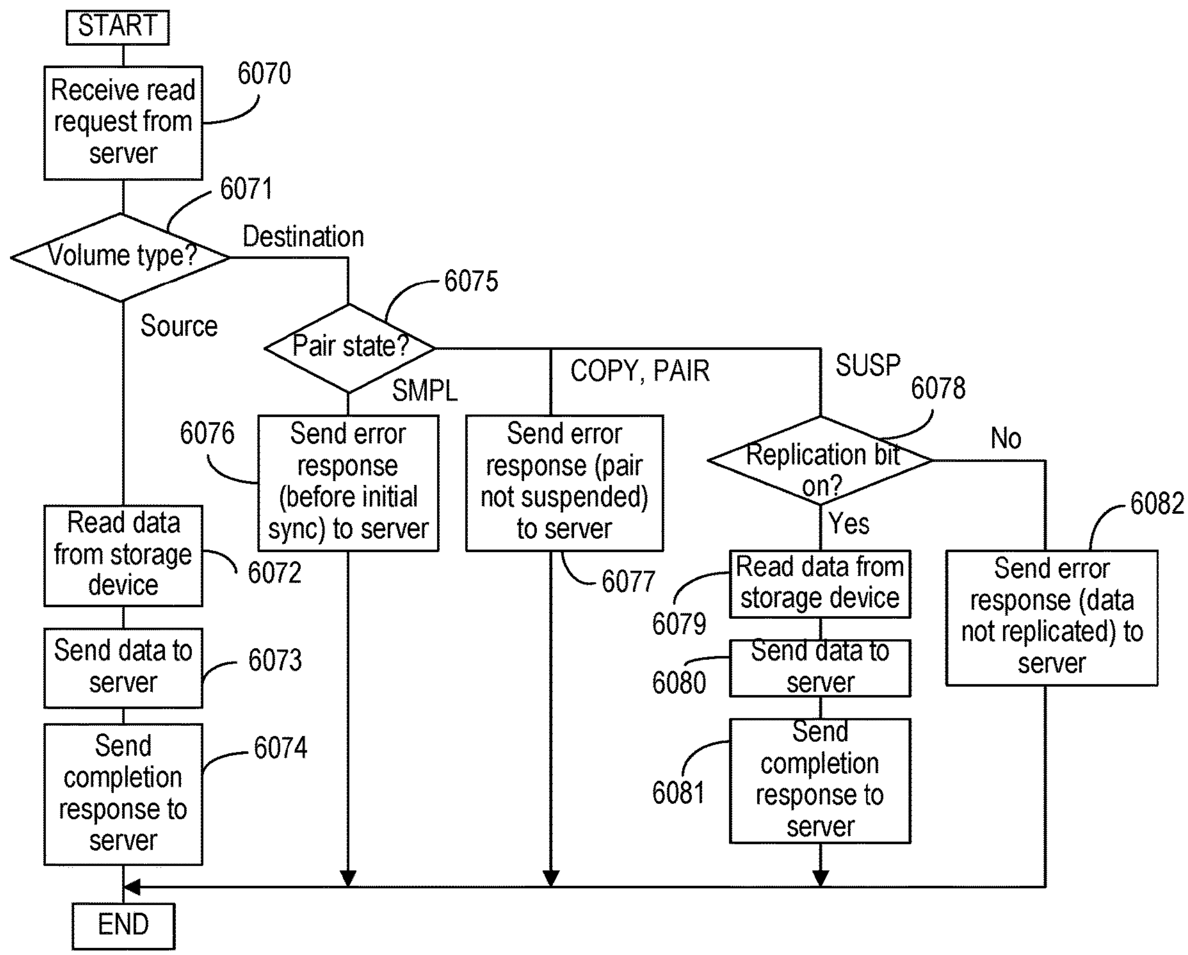
FIG. 13 illustrates a flow chart of a Read Request Processing by I/O Processing Programs, in accordance with an example implementation.

FIG. 13 illustrates a flow chart of Read Request Processing by I/O Processing Programs 220A and 220B, in accordance with an example implementation. Specifically, FIG. 13 shows the flow of read request processing executed by I/O Processing Program 220A when Storage System 2A receives a read request from Server 1A or by I/O Processing Program 220B when Storage System 2B receives a read request from Server 1B. The read request contains information used to identify the volume and the region within the volume from which the requested data is to be read.

At 6070, the I/O Processing Program 220A or 220B receives the read request from Server 1A or Server 1B. At 6071, the I/O Processing Program 220A or 220B determines whether the target volume of the read request is the source volume or the destination volume of a replication pair. In order to make this determination, I/O Processing Program 220A or 220B extracts the information used to identify the volume from which the requested data is to be read from the read request, and locates the entry in Pair Management Table 222A or 222B that corresponds to that volume. I/O Processing Program 220A or 220B then references Volume Type 2221A or 2221B of the located entry. If the volume type is a source volume (Source), the flow proceeds to 6072, otherwise if the volume type is a destination volume (Destination), then the flow proceeds to 6075.

At 6072, the I/O Processing Program 220A reads the requested data from Storage Device 23A and writes the data to Cache Area 223A. I/O Processing Program 220A may use Memory 22A to keep track of which data is stored in Cache Area 223A and skip reading the requested data from storage Device 23A if the requested data is already stored in Cache Area 223A. At 6073, the I/O Processing Program 220A sends the requested data from Cache Area 223A to Server 1A. Alternatively, I/O Processing Program 220A skips the flow of 6072 and sends the requested data directly from Storage Device 23A to Server 1A. At 6074, the I/O Processing Program 220A sends a completion response indicating completion of read request processing to Server 1A.

At 6075, the I/O Processing Program 220B determines whether the pair state of the replication pair to which the target volume belongs is "SMPL", "COPY", "PAIR" or "SUSP".

In order to make this determination, I/O Processing Program 220B references Pair State 2225B of the entry located in the flow at 6071. If the pair state is such that the replication pair has been defined but that no data has been replicated yet (SMPL), the flow proceeds to 6076. If the replication pair is in the process of being synchronized or has been synchronized (COPY, PAIR), the flow proceeds to 6077. Otherwise, if the replication pair is suspended (SUSP), the flow proceeds to 6078.

At 6076, the I/O Processing Program 220B sends an error response to Server 1B indicating that the requested data could not be read because the initial synchronization of the replication pair has not been performed yet. At 6077, the I/O Processing Program 220B sends an error response to Server 1B indicating that the requested data could not be read because the replication pair has not been suspended.

At 6078, the I/O Processing Program 220B determines whether the requested data has been replicated to Storage System 2B or not. In order to make this determination, I/O Processing Program 220B references Replication Bitmap 2226B of the entry located in Step 6071. If the information of Replication Bitmap 2226B corresponding to the region where the requested data is stored is equal to "On", then I/O Processing Program 220B determines that the requested data has been replicated (Yes). Otherwise, I/O Processing Program 220B determines that the requested data has not been replicated (No). If the requested data spans multiple regions managed by Replication Bitmap 2226B, I/O Processing Program 220B determines that the requested data has been replicated if the information corresponding to all of the regions is "On" (Yes). Otherwise, I/O Processing Program 220B determines that the requested data has not been replicated (No).

At 6079, the I/O Processing Program 220B reads the requested data from Storage Device 23B and stores it in Cache Area 223B. I/O Processing Program 220B may use Memory 22B to keep track of which data is stored in Cache Area 223B and skip reading the requested data from storage Device 23B if the requested data is already stored in Cache Area 223B. At 6080, the I/O Processing Program 220B sends the requested data from Cache Area 223B to Server 1B. Alternatively, I/O Processing Program 220B skips Step 6072 and sends the requested data directly from Storage Device 23B to Server 1B. At 6081, the I/O Processing Program 220B sends a completion response indicating completion of read request processing to Server 1B.

At 6082, the I/O Processing Program 220B sends an error response to Server 1B indicating that the requested data could not be read because it is not being replicated.

Figure 14:
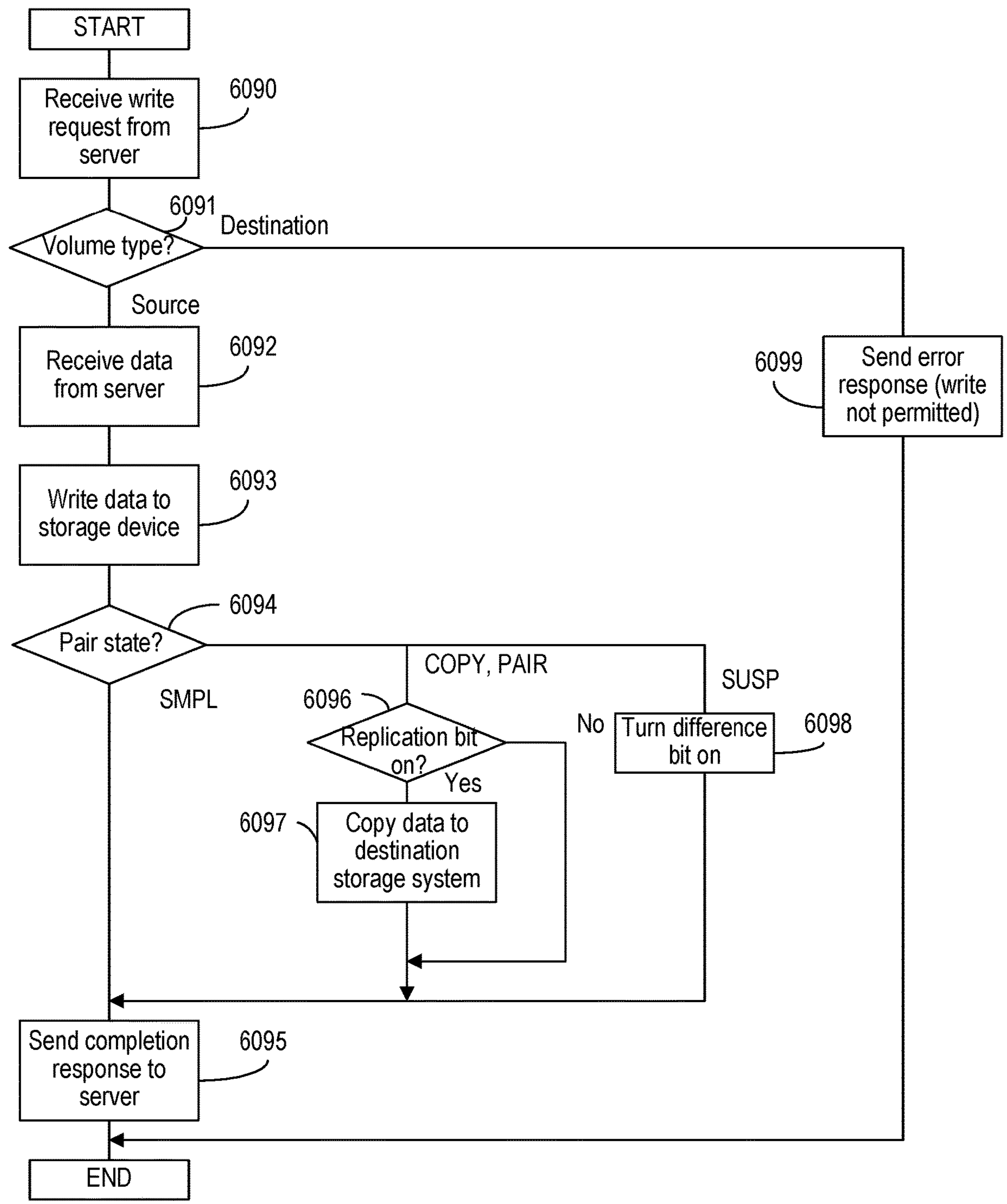
FIG. 14 illustrates a flow chart of Write Request Processing by I/O Processing Programs 220A and 220B, in accordance with an example implementation.

FIG. 14 illustrates a flow chart of Write Request Processing by I/O Processing Programs 220A and 220B, in accordance with an example implementation. Specifically, FIG. 14 shows the flow of write request processing executed by I/O Processing Program 220A when Storage System 2A receives a write request from Server 1A or by I/O Processing Program 220B when Storage System 2B receives a write request from Server 1B. The write request contains information used to identify the volume and the region within the volume to which the requested data is to be written.

At 6090, the I/O Processing Program 220A or 220B receives the write request from Server 1A or Server 1B. At 6091, the I/O Processing Program 220A or 220B determines whether the target volume of the write request is the source volume or the destination volume of a replication pair. In order to make this determination, I/O Processing Program 220A or 220B extracts the information used to identify the volume to which the requested data is to be written from the write request, and locates the entry in Pair Management Table 222A or 222B that corresponds to that volume. I/O Processing Program 220A or 220B then references Volume Type 2221A or 2221B of the located entry. If the target volume of the write request is the source volume (Source), then the flow proceeds to 6092, otherwise (Destination), the flow proceeds to 6099.

At 6092, the I/O Processing Program 220A receives the requested data from Server 1A and writes the data to Cache Area 223A. Alternatively, I/O Processing Program 220A receives the requested data from Server 1A and writes the data directly to Storage Device 23A. At 6093, the I/O Processing Program 220A reads the requested data from Cache Area 223A and writes the data to Storage Device 23A. Alternatively, I/O Processing Program 220A skips the flow at 6093 and writes the data to Storage Device 23A asynchronous to the write request, depending on the desired implementation.

At 6094, the I/O Processing Program 220A determines whether the pair state of the replication pair to which the target volume belongs is "SMPL", "COPY", "PAIR" or "SUSP". In order to make this determination, I/O Processing Program 220A references Pair 2225A of the entry from 6091. If the target volume is SMPL, then the flow proceeds to 6095, wherein the I/O Processing Program 220A sends a completion response indicating completion of write request processing to Server 1A. If the target volume is "COPY" or "PAIR", then the flow proceeds to 6096. Otherwise if target volume is "SUSP", then the flow proceeds to 6098.

At 6096, the I/O Processing Program 220A determines whether the data received from Server 1A at 6082 is to be replicated to Storage System 2B or not. In order to make this determination, I/O Processing Program 220A references Replication Bitmap 2226A of the entry from 6091. If the information of Replication Bitmap 2226A corresponding to the region where the data is to be written is equal to "On", then I/O Processing Program 220A determines that the data is to be replicated (Yes). Otherwise (No), I/O Processing Program 220A determines that the data is not to be replicated. At 6097, the I/O Processing Program 220A copies the data received from Server 1A at 6092 to the volume identified by Destination Volume ID 2224A of the entry located at 6091.

If the data spans multiple regions managed by Replication Bitmap 2226A, I/O Processing Program 220A executes the flow at 6096 and 6097 for each region. If the information of Replication Bitmap 2226A corresponding to only some of the regions is equal to "On", then I/O Processing Program 220A only copies the data corresponding to those regions.

At 6098, the I/O Processing Program 220A updates Difference Bitmap 2227A of the entry located at 6091 by setting the information of Difference Bitmap 2227A corresponding to the data received from Server 1A at 6092 to "On". If the data spans multiple regions managed by Replication Bitmap 2227A, I/O Processing Program 220A sets the information of Difference Bitmap 2227A corresponding to each region to "On".

At 6099, the I/O Processing Program 220B sends an error response to Server 1B indicating that the requested data could not be written because writing is not permitted.

In a second example implementation, the storage system manages which subset of the regions of one or more volumes is permitted to be replicated to another storage system. The physical configuration of the system is the same as described in the first example implementation above. The differences in logical configuration of the system and how the system is controlled are described below.

FIG. 15 illustrates logical layouts of Pair Management Tables 222A and 222B, in accordance with an example implementation. Specifically, FIG. 15 shows the logical layouts of Pair Management Table 222A and Pair Management Table 222B in the second example implementation. The logical layout of Pair Management Table 222A is essentially the same as described in the first example implementation, however, each entry of Pair Management Table 222A contains an additional field, Permission Bitmap 2229A. Permission Bitmap 2229A is used to manage the regions of the source volume that are permitted to be replicated to the destination volume. Permission Bitmap 2229A contains information for each region of the source volume. The size of each region is, for example, 256 KB or 42 MB. Example values for the information stored for each region are "On" and "Off". "On" denotes that the region is permitted to be replicated, and "Off" denotes that the region is not permitted to be replicated.

The logical layout of Pair Management Table 222B is essentially the same as in the first example implementation, but each entry of Pair Management Table 222B contains an additional field, Permission Bitmap 2229B. Permission Bitmap 2229B is used to manage the regions of the source volume that are permitted to be replicated to the destination volume. Permission Bitmap 2229B contains information for each region of the source volume. The size of each region is, for example, 256 KB or 42 MB. Example values for the information stored for each region are "On" and "Off". "On" denotes that the region is permitted to be replicated, and "Off" denotes that the region is not permitted to be replicated.

Figure 16:
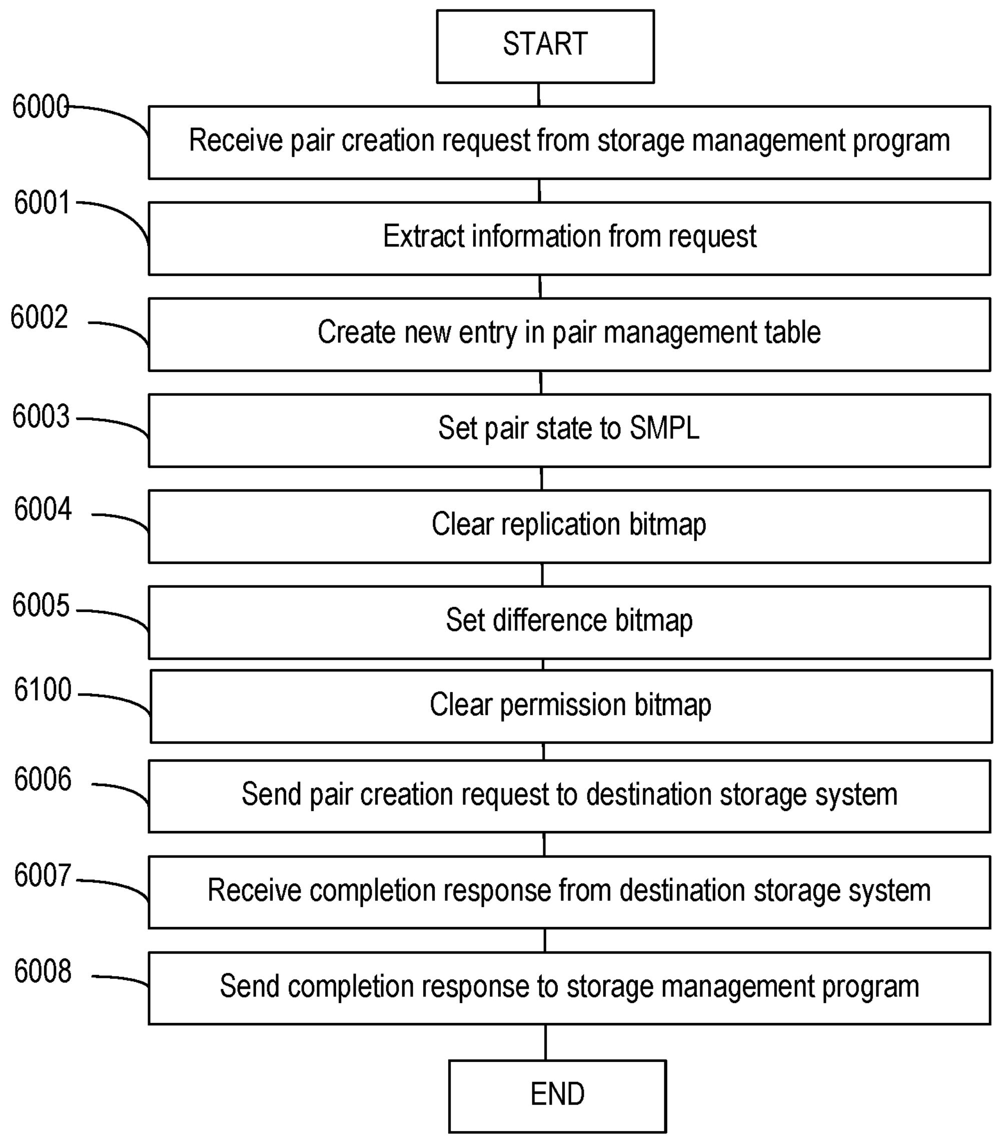
FIG. 16 illustrates a flow chart of a Pair Creation by Replication Management Program, in accordance with an example implementation.

FIG. 16 illustrates a flow chart of Pair Creation by Replication Management Program 221A, in accordance with an example implementation. Specifically, FIG. 16 shows the flow for pair creation in a second example implementation. This flow is executed by Replication Management Program 221A when Storage System 2A receives a pair creation request from Storage Management Program 122A.

The flow of pair creation is essentially the same as the flow in the first example implementation described in FIG. 7. However, there is an additional flow at 6100, between the flow at 6005 and 6006. At 6100, the Replication Management Program 221A clears Permission Bitmap 2229A of the new entry created in Step 6002 by setting the information corresponding to each region to "Off".

Figure 17:
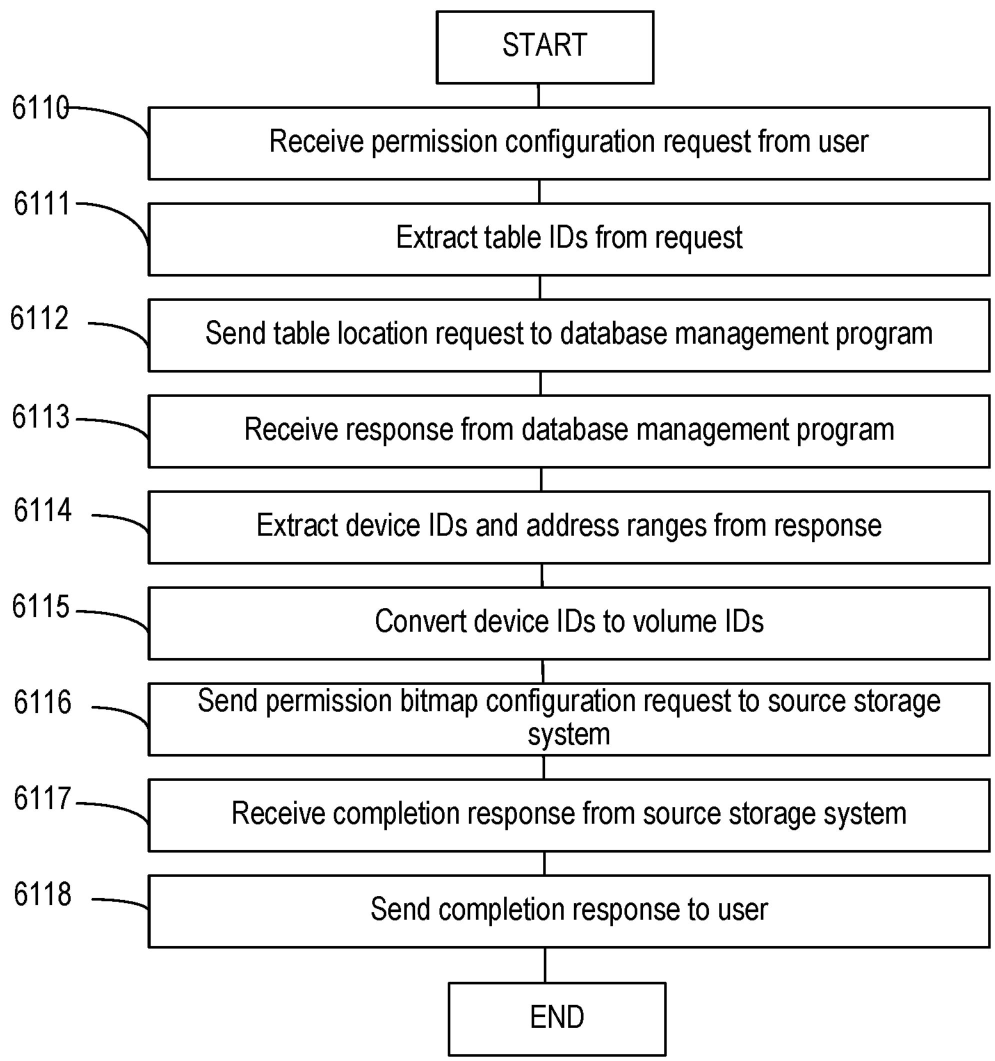
FIG. 17 illustrates the flow chart of a Permission Configuration by Storage Management Program, in accordance with an example implementation.

FIG. 17 illustrates the flow chart of Permission Configuration by Storage Management Program 122B, in accordance with an example implementation. Specifically, FIG. 17 shows the flow of permission configuration executed by Storage Management Program 122B when Server 1A receives a permission configuration request from a user or a program written by the user. The permission configuration request contains the IDs of the tables that are permitted to be replicated from Storage System 2A to Storage System 2B.

At 6110, the Storage Management Program 122B receives the permission configuration request from the user. At 6111, the Storage Management Program 122B extracts the tables IDs from the permission configuration request. At 6112, the Storage Management Program 122B sends a table location request to Database Management Program 121A. The table location request contains the IDs of the tables extracted at 6101. When Database Management Program 121A receives the table location request, Database Management Program 121A sends a response to the table location request to Storage Management Program 122B. The response contains the locations of the tables corresponding to the IDs contained in the table location request. Each location is, for example, the ID of a device managed by Server 1A and the address range specifying a region within the device.

Instead of sending the table location request to Database Management Program 121A, Storage Management Program 122B may send the table location request to Database Management Program 121B.

At 6113, the Storage Management Program 122B receives the response to the table location request from Database Management Program 121A. At 6114, the Storage Management Program 122B extracts the device IDs and the address ranges from the response received in Step 6113. At 6115, the Storage Management Program 122B converts each device ID extracted from 6114 to an ID that is used to identify volumes within Storage System 2A by looking up Device/Volume Conversion Table 123B.

At 6116, the Storage Management Program 122B sends a permission bitmap configuration request to Storage System 2A. The permission bitmap configuration request contains the volume IDs obtained in Step 6115 and the address ranges extracted at 6114. Storage Management Program 122B may send the permission bitmap configuration request to Storage System 2A via Storage System 2B or via Storage Management Program 122A. Instead of volume IDs, the permission bitmap configuration request may contain the IDs of the replication pairs applied to the volumes.

Instead of address ranges, the permission bitmap configuration request may contain bitmaps. The bitmaps are created by Storage Management Program 122B from the address ranges extracted from 6114. Each bit in the bitmaps corresponds to a bit in Replication Bitmap 2226A. When Storage System 2A receives the permission bitmap configuration request, Storage System 2A executes the flow shown in FIG. 18.

At 6117, the Storage Management Program 122B receives a completion response indicating the completion of permission bitmap configuration from Storage System 2A. At 6118, the Storage Management Program 122B sends a completion response indicating the completion of permission configuration to the user or the program written by the user.

Figure 18:
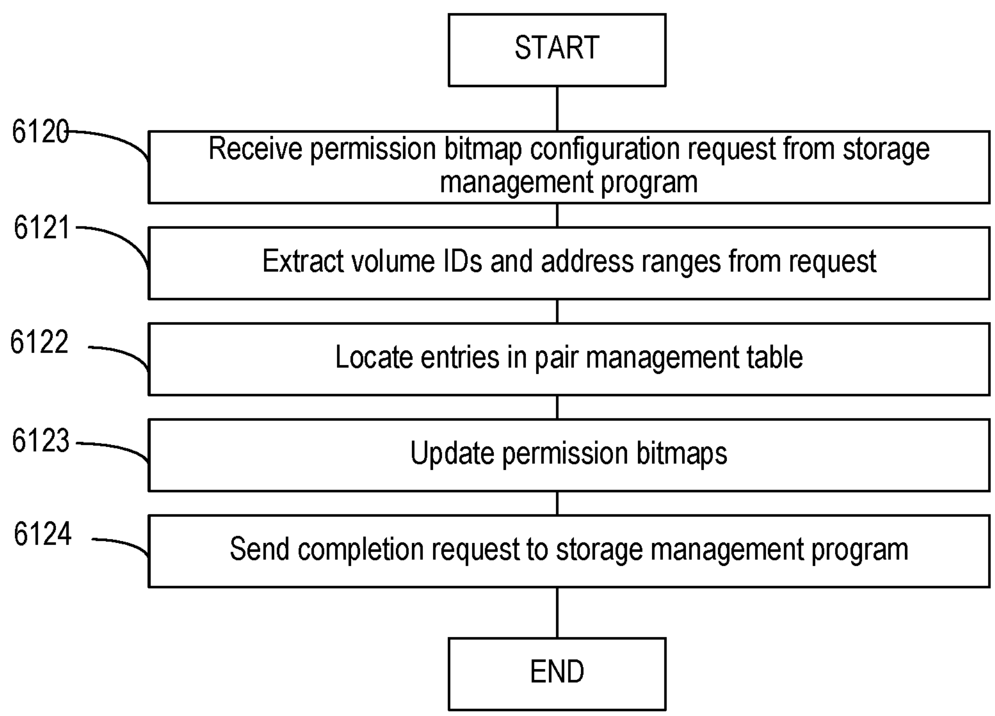
FIG. 18 illustrates the flow chart of a Permission Bitmap Configuration by Replication Management Program, in accordance with an example implementation.

FIG. 18 illustrates the flow chart of Permission Bitmap Configuration by Replication Management Program 221A, in accordance with an example implementation. Specifically, FIG. 18 shows the flow of permission bitmap configuration executed by Replication Management Program 221A when Storage System 2A receives the permission bitmap configuration request sent by Storage Management Program 221B at 6116.

At 6120, the Replication Management Program 221A receives the permission bitmap configuration request from Storage Management Program 122B. At 6121, the Replication Management Program 221A extracts the volume IDs or pair IDs and the address ranges or bitmaps from the permission bitmap configuration request.

At 6122, the Replication Management Program 221A locates the entry in Pair Management Table 222A corresponding to each volume ID or pair ID extracted from 6121. In order to locate each entry, Replication Management Program 221A searches Pair Management Table 222A for the entry whose Source Volume ID 2223A is equal to the extracted volume ID or whose Pair ID 2220A is equal to the extracted pair ID.

At 6123, the Replication Management Program 221A updates Permission Bitmap 2229A of each entry located from 6122 by setting the information corresponding to the address range extracted in Step 6121 to “On”. If bitmaps instead of address ranges were extracted from 6121, Replication Management Program 221A updates Permission Bitmap 2229A of each entry located from 6122 by copying the bitmap extracted from 6121 to Replication Bitmap 2229A. At 6124, the Replication Management Program 221A sends a completion response indicating completion of permission bitmap configuration to Storage Management Program 122B.

Figure 19:
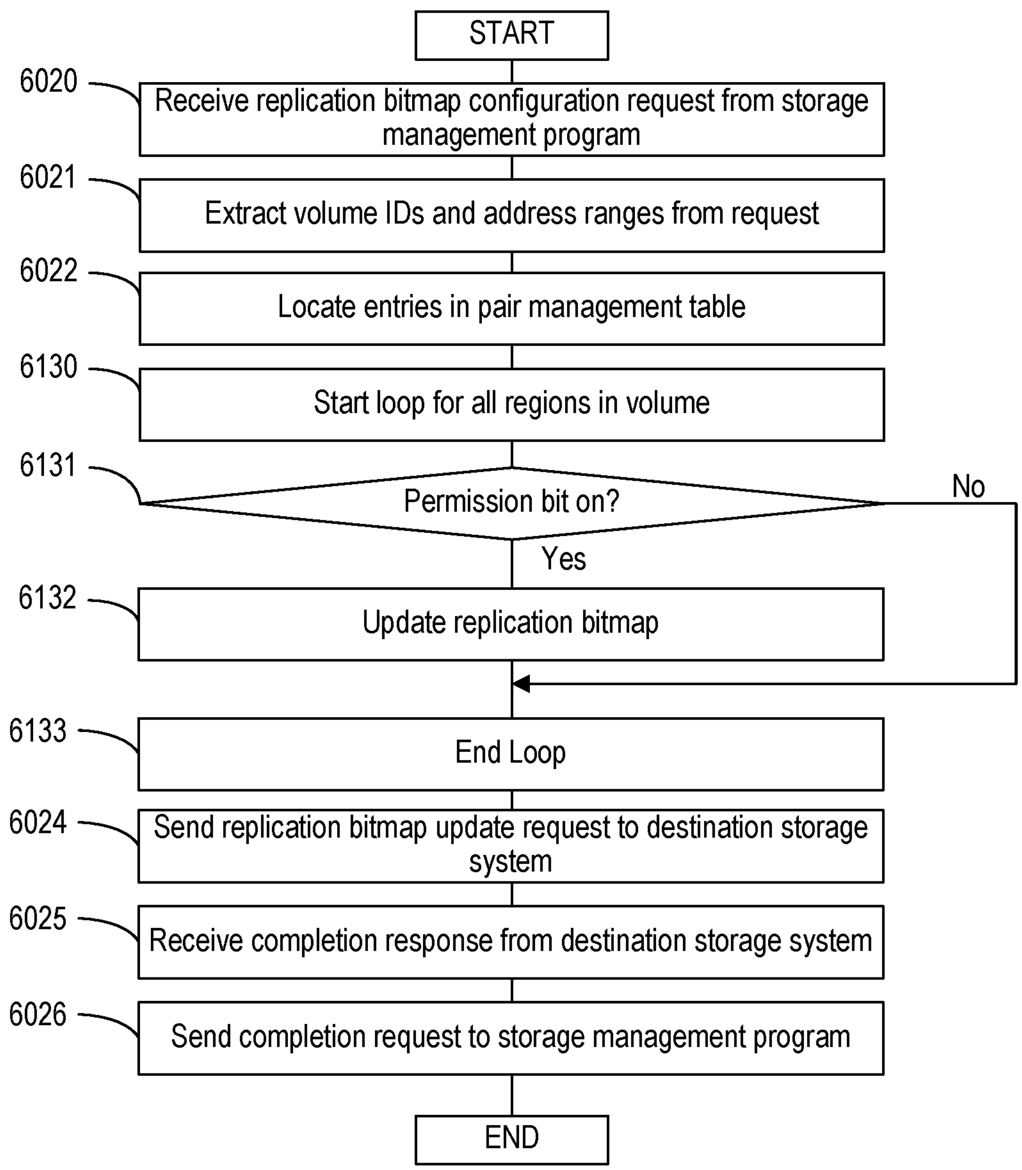
FIG. 19 illustrates a flow chart of the Replication Bitmap Configuration by Replication Management Program, in accordance with an example implementation.

FIG. 19 illustrates a flow chart of the Replication Bitmap Configuration by Replication Management Program 221A, in accordance with an example implementation. Specifically, FIG. 19 shows the flow of replication bitmap configuration for the second example implementation. This flow is executed by Replication Management Program 221A when Storage System 2A receives the replication bitmap configuration request sent by Storage Management Program 221A from the flow of 6016. The flow of replication bitmap configuration is essentially the same as the flow in the first example implementation as illustrated in FIG. 9. However, the flow at 6023 is replaced by the flow from 6130 through 6133.

At 6130, the Replication Management Program 221A starts a loop that executes the flow from 6131 through 6132 for each region of the volume identified by Source Volume ID 2223A of the entry located in the flow at 6022. At 6131, the Replication Management Program 221A references Permission Bitmap 2229A of the entry located in the flow at 6022 and determines whether the information corresponding to the region is equal to “On”. If the information of Permission Bitmap 2229A corresponding to the region is set to “On”, the flow proceeds to 6132. Otherwise, the flow proceeds to 6133.

At 6132, the Replication Management Program 221A updates Replication Bitmap 2226A of the entry located in the flow at 6022 by setting the information corresponding to the region to “On”. At 6133, the Replication Management Program 221A ends the loop started at the flow of 6130.

In a third example implementation, there is a storage system creates a consistent remote snapshot of a subset of the regions of one or more volumes. The physical configuration of the system is the same in the first example implementation. The differences in logical configuration of the system and how the system is controlled are described below.

FIG. 20 illustrates a Logical Layout of Memory 12A, in accordance with an example implementation. Specifically, FIG. 20 illustrates the logical layout of Memory 12A in a third example implementation. The layout of Memory 12A is essentially the same as described in the first example implementation, but Memory 12A contains Table ID List 124A in addition to Application Program 120A, Database Management Program 121A, Storage Management Program 122A and Device/Volume Conversion Table 123A. Table ID List 124A is a list of table IDs used by Storage Management Program 122A to remember the table IDs included in a replication configuration request from a user.

FIG. 21 illustrates a flow chart of Replication Configuration by Storage Management Program 122A, in accordance with an example implementation. Specifically, FIG. 21 illustrates the flow of a replication configuration in a third example implementation. This flow is executed by Storage Management Program 122A when Server 1A receives a replication configuration request from a user or a program written by the user. The flow of replication configuration is essentially the same as the flow in a first example implementation as shown in FIG. 8. However, there is an additional flow at 6140, between the flow at 6011 and 6012. At 6140, the Storage Management Program 122A saves the table IDs extracted in Step 6011 in Table ID List 124A.

Figure 22:
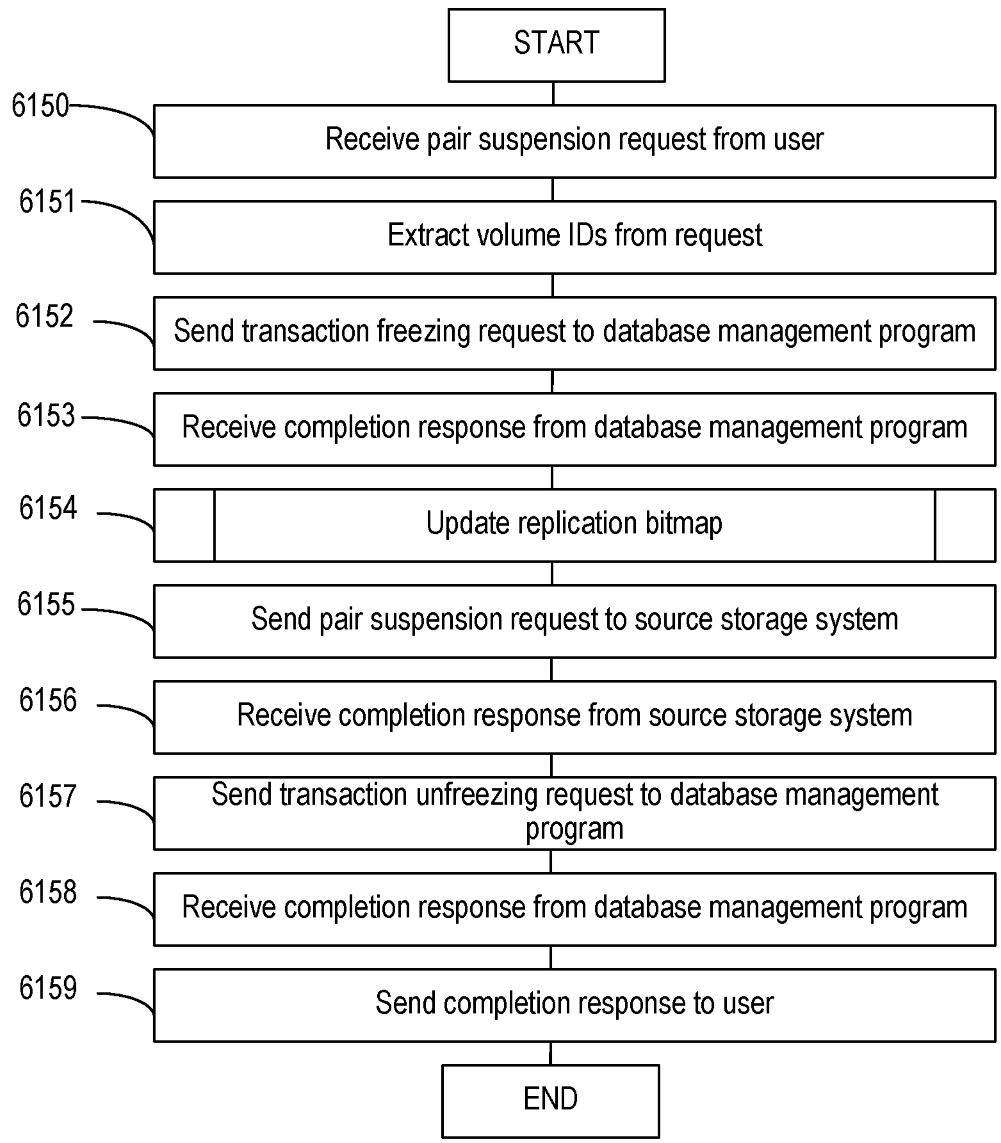
FIG. 22 illustrates the flow chart of a Pair Suspension by Storage Management Program 122A, in accordance with an example implementation.

FIG. 22 illustrates the flow chart of Pair Suspension by Storage Management Program 122A, in accordance with an example implementation. FIG. 22 shows the flow of pair suspension executed by Storage Management Program 122A when Server 1A receives a pair suspension request from a user or a program written by the user. The pair suspension request contains the ID of the source volume of the replication pair to be suspended. The pair suspension request may contain the ID of the replication pair to be suspended instead of the ID of the source volume.

At 6150, the Storage Management Program 122A receives the pair suspension request from the user. At 6151, the Storage Management Program 122A extracts the volume ID or the pair ID from the pair suspension request. At 6152, the Storage Management Program 122A sends a transaction freezing request to Database Management Program 121A.

When Database Management Program 121A receives the transaction freezing request, Database Management Program 121A stops processing new transactions and instead queues them for later processing. Database Management Program 121A continues to process transactions that had already been started when Database Management Program 121A received the freeze request. When Database Management Program 121A has completed all of the transactions that had already been started when Database Management Program 121A received the freeze request, Database Management Program 121A sends a completion response indicating the completion of transaction freezing to Storage Management Program 122A.

At 6153, the Storage Management Program 122A receives the completion response indicating completion of transaction freezing from Database Management Program 121A. At 6154, the Storage Management Program 122A updates the Replication Bitmaps 2226A of Storage System 2A by executing the flow shown in FIG. 23. At 6155, the Storage Management Program 122A sends a pair suspension request to Storage System 2A. Storage Management Program 122A includes the volume ID or the pair ID extracted from 6151 in the pair suspension request. When Storage System 2A receives the pair suspension request, Replication Management Program 221A suspends the volume identified by the volume ID included in the pair suspension request by executing the flow in FIG. 12.

At 6156, the Storage Management Program 122A receives the completion response indicating the completion of pair suspension from Storage System 2A. At 6157, the Storage Management Program 122A sends a transaction unfreezing request to Database Management Program 121A. When Database Management Program 121A receives the transaction unfreezing request, Database Management Program 121A processes the transactions that have been queued at the flow at 6152.

When Database Management Program 121A has completed all of the queued transactions, Database Management Program 121A resumes processing new transactions and sends a completion response indicating the completion of transaction unfreezing to Storage Management Program 122A.

At 6158, the Storage Management Program 122A receives the completion response indicating completion of transaction unfreezing from Database Management Program 121A. At 6159, the Storage Management Program 122A sends a completion response indicating the completion of pair suspension to the user or the program written by the user.

FIG. 23 illustrates the flow chart of the Replication Bitmap Update by Storage Management Program 122A, in accordance with an example implementation. Specifically, FIG. 23 shows the flow of replication bitmap update executed by Storage Management Program 122A. This flow corresponds to the flow at 6154 in FIG. 22.

In addition to executing the flow at 6154 in FIG. 22, Storage Management Program 122A may execute this flow periodically. By executing this flow periodically, Storage Management Program 122A is able to keep the Replication Bitmaps 2226A of Storage System 2A up to date. This flow can shorten the time between the flow at 6152 and 6157 during which transactions are frozen.

At 6160, the Storage Management Program 122A retrieves the table IDs saved in Table ID List 124A. At 6161, the Storage Management Program 122A sends a table location request to Database Management Program 121A. The table location request contains the table IDs retrieved at 6060.

When Database Management Program 121A receives the table location request, Database Management Program 121A sends a response to the table location request to Storage Management Program 122A. The response contains the locations of the tables corresponding to the IDs contained in the table location request. Each location is, for example, the ID of a device managed by Server 1A and the address range specifying a region within the device.

At 6162, the Storage Management Program 122A receives the response to the table location request from Database Management Program 121A. At 6163, the Storage Management Program 122A extracts the device IDs and the address ranges from the response to the table location request. At 6164, the Storage Management Program 122A converts each device ID extracted from 6163 to an ID that is used to identify volumes within Storage System 2A by looking up Device/Volume Conversion Table 123A. At 6165, the Storage Management Program 122A sends a replication bitmap configuration request to Storage System 2A. The replication bitmap configuration request contains the volume IDs obtained from 6164 and the address ranges extracted from 6163. Instead of volume IDs, the replication bitmap configuration request may contain the IDs of the replication pairs applied to the volumes.

Instead of address ranges, the replication bitmap configuration request may contain bitmaps. The bitmaps are created by Storage Management Program 122A from the address ranges extracted from 6163. Each bit in the bitmaps corresponds to a bit in Replication Bitmap 2226A. When Storage System 2A receives the replication bitmap configuration request, Storage System 2A executes the flow shown in FIG. 24. At 6166, the Storage Management Program 122A receives a completion response indicating the completion of replication bitmap configuration from Storage System 2A.

Figure 24:
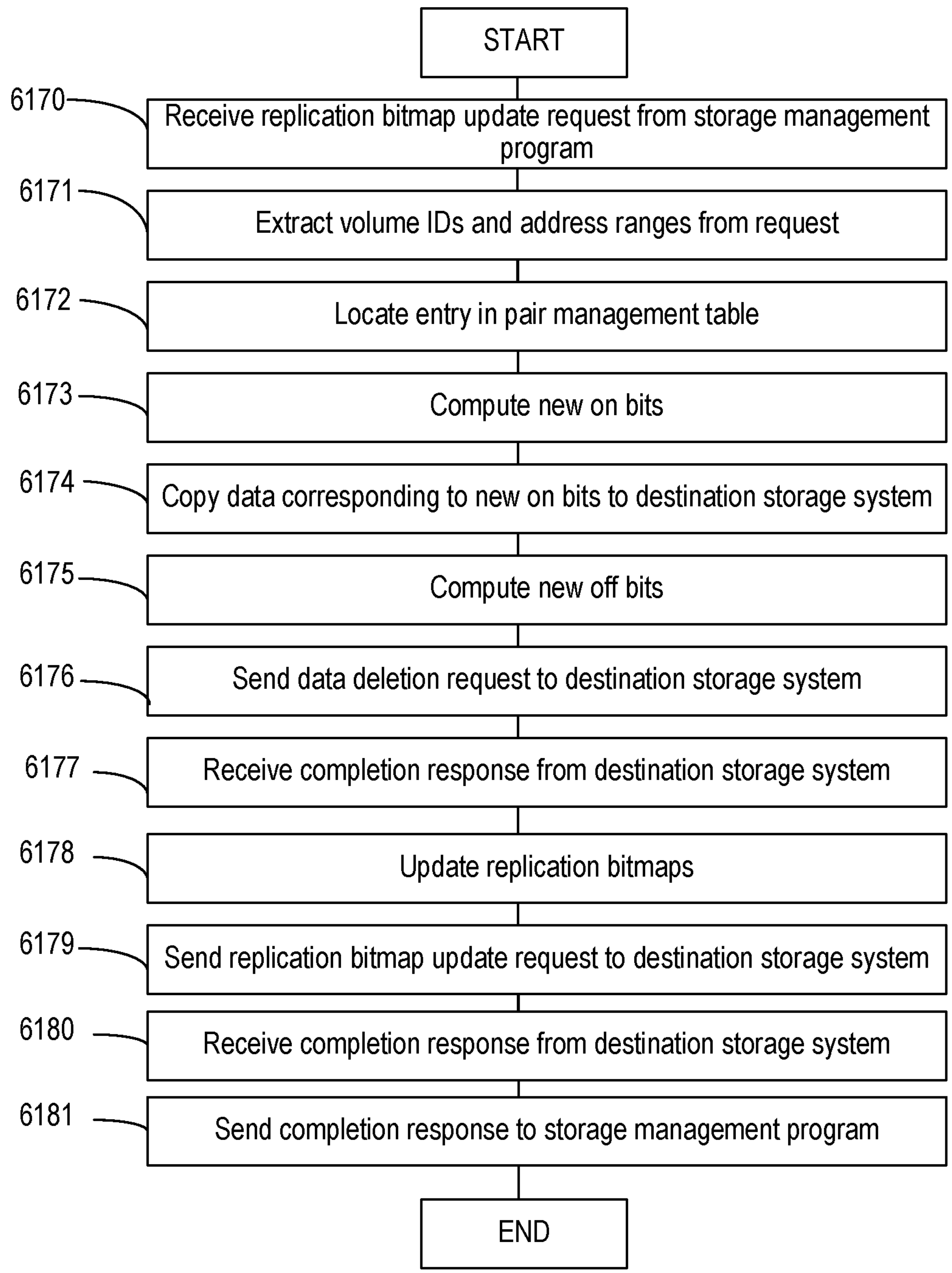
FIG. 24 illustrates a flow chart for a Replication Bitmap Update by Replication Management Program, in accordance with an example implementation.

FIG. 24 illustrates a flow chart for a Replication Bitmap Update by Replication Management Program 221A, in accordance with an example implementation. Specifically, FIG. 24 illustrates the flow of replication bitmap update executed by Replication Management Program 221A when Storage System 2A receives the replication bitmap update request sent by Storage Management Program 221A in the flow of 6165.

At 6170, the Replication Management Program 221A receives the replication bitmap update request from Storage Management Program 122A. At 6171, the Replication Management Program 221A extracts the volume IDs or pair IDs and the address ranges or bitmaps from the replication bitmap update request. At 6172, the Replication Management Program 221A locates the entry in Pair Management Table 222A corresponding to each volume ID or pair ID extracted from 6171. In order to locate each entry, Replication Management Program 221A searches Pair Management Table 222A for the entry whose Source Volume ID 2223A is equal to the extracted volume ID or whose Pair ID 2220A is equal to the extracted pair ID.

At 6173, the Replication Management Program 221A computes the new “On” bits for Replication Bitmap 2226A of each entry located from 6172. The Replication Management Program 221A performs this computation for each Replication Bitmap 2226A by determining all of the bits of the Replication Bitmap 2226A that correspond to the address ranges extracted from the flow at 6171 but are equal to “Off”. If bitmaps instead of address ranges were extracted from the flow at 6171, the Replication Management Program 221A determines all of the bits of the Replication Bitmap 2226A that correspond to the on bits of the extracted bitmap but are equal to “Off”.

At 6174, the Replication Management Program 221A copies all of the data corresponding to the new “On” bits computed in Step 6173 to Storage System 2B. At 6175, the Replication Management Program 221A computes the new “Off” bits for Replication Bitmap 2226A of each entry from the flow of 6172. The Replication Management Program 221A performs this computation for each Replication Bitmap 2226A by determining all of the bits of the Replication Bitmap 2226A that do not correspond to the address ranges extracted from 6171 but are equal to “On”. If bitmaps instead of address ranges were extracted from 6171, Replication Management Program 221A determines all of the bits of the Replication Bitmap 2226A that correspond to the off bits of the extracted bitmap but are equal to “On”.

At 6176, the Replication Management Program 221A sends a data deletion request to Storage System 2B. For each entry located in Step 6172, the data deletion request contains Source Volume ID 2223A and the new “Off” bits computed from 6175 of the located entry. When Storage System 2B receives the data deletion request, Replication Management Program 221B deletes the data corresponding to the Source Volume ID 2223A and the “Off” bits contained in the data deletion request. Replication Management Program 221B then sends a completion request indicating completion of data deletion to Storage System 2A.

At 6177, the Replication Management Program 221A receives the completion response indicating completion of data deletion from Storage System 2B. At 6178, the Replication Management Program 221A updates Replication Bitmap 2226A of each entry located from the flow at 6172 by setting the information corresponding to the address range extracted from the flow at 6021 to “On”. If bitmaps instead of address ranges were extracted from the flow at 6171, the Replication Management Program 221A updates Replication Bitmap 2226A of each entry located from the flow at 6172 by copying the bitmap extracted from the flow at 6171 to Replication Bitmap 2226A.

At 6179, the Replication Management Program 221A sends a replication bitmap update request to Storage System 2B. For each entry located from the 6172, the replication bitmap update request contains Source Volume ID 2223A and Replication Bitmap 2226A of the located entry. When Storage System 2B receives the replication bitmap update request, Replication Management Program 221B updates Pair Management Table 222B by locating the entry corresponding to the ID of the source volume contained in the replication bitmap update request and updating Replication Bitmap 2226B of the located entry. Replication Management Program 221B then sends a completion response indicating completion of replication bitmap update to Storage System 2A.

At 6180, the Replication Management Program 221A receives the completion response indicating completion of replication bitmap update from Storage system 2B. At 6181, the Replication Management Program 221A sends a completion response indicating completion of replication bitmap update to Storage Management Program 122A.

In a fourth example implementation, a storage system replicates a subset of one or more volumes to another storage system based on IDs of database tables specified by a user. The physical configuration of the system is the same as described in the first example implementation. The differences in logical configuration of the system and how the system is controlled are described below.

FIG. 25 illustrates Logical Layouts of Pair Management Tables 222A and 222B, in accordance with an example implementation. The logical layout of Pair Management Table 222A is essentially the same as described in the first example implementation. However, each entry of Pair Management Table 222A contains Replication Bit 2226A' instead of Replication Bitmap 2226A. Replication Bit 2226A' is used to manage whether or not the source volume should be replicated to the destination volume. Example values of Replication Bit 2226A' are “On” and “Off”. “On” denotes that the source volume is to be replicated, and “Off” denotes that the source volume is not to be replicated.

The logical layout of Pair Management Table 222B is essentially the same as described in the first example implementation. However, each entry of Pair Management Table 222B contains Replication Bit 2226B' instead of Replication Bitmap 2226B. Replication Bit 2226B' is used to manage whether or not the source volume should be replicated to the destination volume. Example values of Replication Bit 2226B' are “On” and “Off”. “On” denotes that the source volume is to be replicated, and “Off” denotes that the source volume is not to be replicated.

Figure 26:
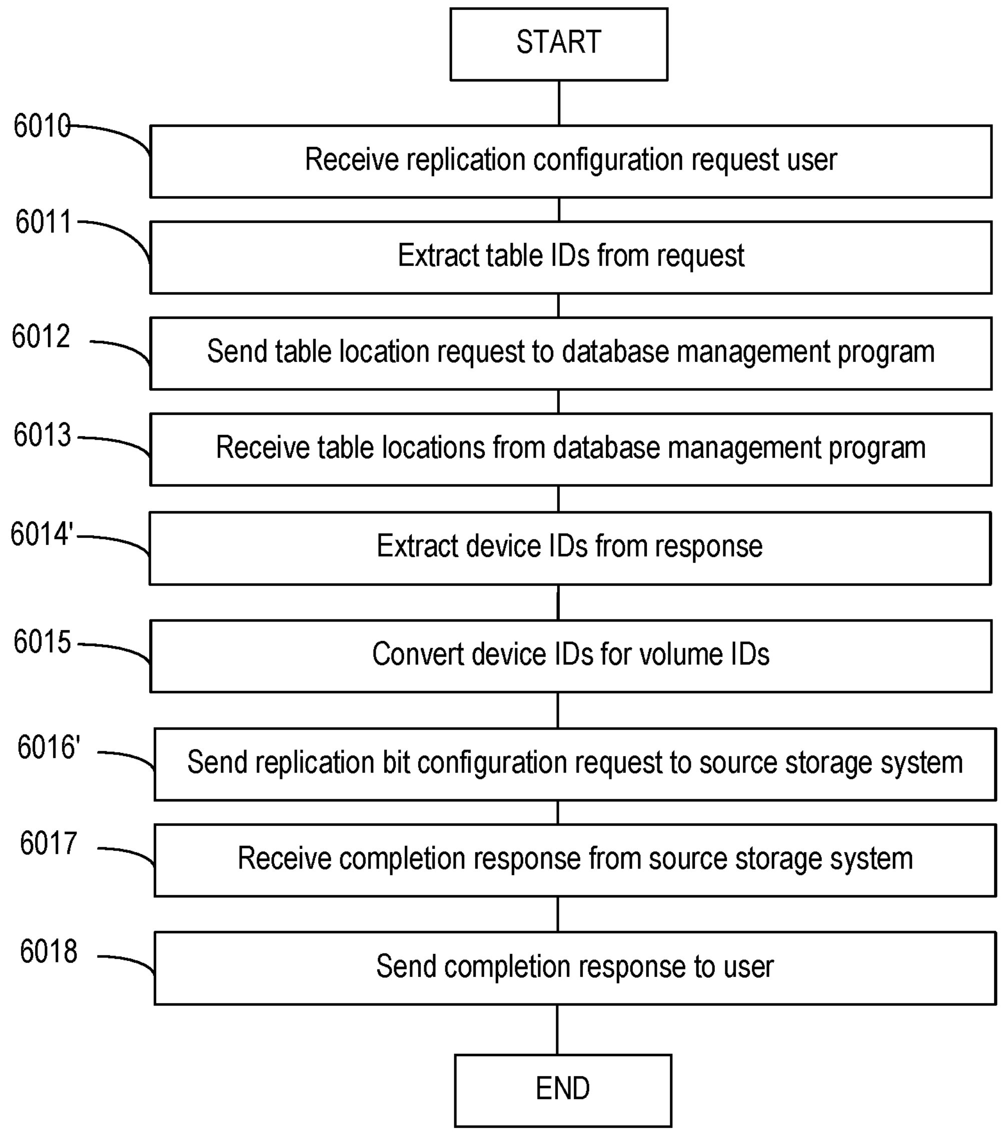
FIG. 26 illustrates a flow chart of the Replication Configuration by Storage Management Program, in accordance with an example implementation.

FIG. 26 illustrates a flow chart of the Replication Configuration by Storage Management Program 122A, in accordance with an example implementation. Specifically, FIG. 26 shows the flow of replication configuration executed by Storage Management Program 122A when Server 1A receives a replication configuration request from a user or a program written by the user. The flow of the replication configuration is essentially the same as the flow described in FIG. 8. However, the flow at 6014 and 6016 are replaced by the flow at 6014' and 6016'.

At 6014', the Storage Management Program 122A extracts the device IDs from the response to the table location request. At 6016', the Storage Management Program 122A sends a replication bit configuration request to Storage System 2A. The replication bit configuration request contains the volume IDs obtained from the flow at 6015. Instead of volume IDs, the replication bitmap configuration request may contain the IDs of the replication pairs applied to the volumes. When Storage System 2A receives the replication bitmap configuration request, Storage System 2A executes the flow shown in FIG. 27.

Figure 27:
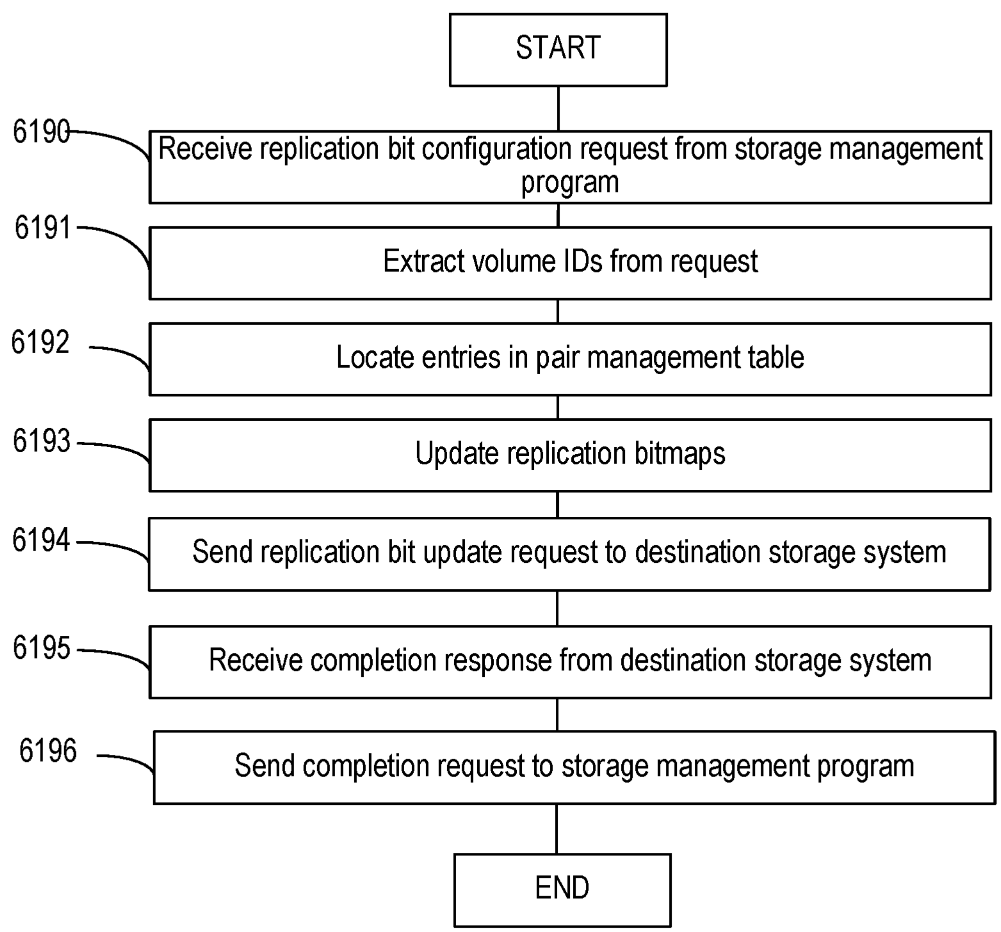
FIG. 27 illustrates a flow chart of the Replication Bit Configuration by Replication Management Program, in accordance with an example implementation.

FIG. 27 illustrates a flow chart of the Replication Bit Configuration by Replication Management Program 221A, in accordance with an example implementation. Specifically, FIG. 27 shows the flow of replication bit configuration executed by Replication Management Program 221A when Storage System 2A receives the replication bit configuration request sent by Storage Management Program 221A in the flow at 6016'.

At 6190, the Replication Management Program 221A receives the replication bit configuration request from Storage Management Program 122A. At 6191, the Replication Management Program 221A extracts the volume IDs or pair IDs from the replication bit configuration request. At 6192, the Replication Management Program 221A locates the entry in Pair Management Table 222A corresponding to each volume ID or pair ID extracted from the flow at 6191. In order to locate each entry, Replication Management Program 221A searches Pair Management Table 222A for the entry whose Source Volume ID 2223A is equal to the extracted volume ID or whose Pair ID 2220A is equal to the extracted pair ID.

At 6193, the Replication Management Program 221A sets Replication Bit 2226A' of each entry located from the flow at 6192. At 6194, the Replication Management Program 221A sends a replication bit update request to Storage System 2B. For each entry located in the flow at 6192, the replication bit update request contains Source Volume ID 2223A and Replication Bit 2226A' of the located entry.

When Storage System 2B receives the replication bit update request, Replication Management Program 221B updates Pair Management Table 222B by locating the entry corresponding to the ID of the source volume contained in the replication bitmap update request and updating Replication Bit 2226B' of the located entry. Replication Management Program 221B then sends a completion response indicating completion of replication bit update to Storage System 2A.

At 6195, the Replication Management Program 221A receives the completion response indicating completion of replication bit update from Storage system 2B. At 6196, the Replication Management Program 221A sends a completion response indicating completion of replication bit configuration to Storage Management Program 122A.

As in the first example implementation, the Replication Management Program 221A executes the flow shown in FIG. 10 when Storage System 2A receives a pair synchronization request from Storage Management Program 122A. However, in the flow at 6051, Replication Management Program 221A determines whether the region is to be copied or not by referencing Replication Bit 2226A' instead of Replication Bitmap 2226A.

As in the first example implementation, I/O Processing Program 220B executes the flow shown in FIG. 13 when Storage System 2B receives a read request from Server 2B. However, in the flow at 6078, I/O Processing Program 220B determines whether the requested data has been replicated to Storage System 2B or not by referencing Replication Bit 2226B' instead of Replication Bitmap 2226B.

As in the first example implementation, I/O Processing Program 220A executes the flow shown in FIG. 14 when Storage System 2A receives a write request from Server 1A. However, in the flow at 6096, I/O Processing Program 220A determines whether the data received from Server 1A is to be replicated to Storage System 2B or not by referencing Replication Bit 2226A' instead of Replication Bitmap 2226A.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A storage system, comprising:

a plurality of storage volumes, each of the plurality of storage volumes comprising a plurality of regions;

a memory configured to store a pair management table comprising a plurality of entries each corresponding to a pair of volumes, each pair of volumes comprising a first volume of the plurality of storage volumes and a second volume of a second storage system, the pair management table stores, for each entry, a difference bitmap storing difference information indicating whether there are differences or not between the plurality of regions of the first volume of a respective pair of storage volumes and a second volume of the respective pair; and a processor, configured to, for receipt of a command to replicate the first volume of the plurality of storage volumes to the second volume of the second storage system:

store, in the pair management table, a replication bitmap configured by a server that issued the command, wherein the replication bitmap stores replication information indicative of, for each of the plurality of regions of the first volume, whether the each of the plurality of regions is replicable to the second volume or not replicable to the second volume;

determine that first ones of the plurality of regions of the first volume are replicable to the second volume based on the replication bitmap stored in the pair management table;

in response to the determination, replicate, to the second volume, first ones of the plurality of regions of the first volume when the first ones of the plurality of regions of the first volume are (i) indicated as replicable to the second volume by the replication bitmap and (ii) indicated as being different by the difference bitmap; and not replicate, to the second volume, first ones of the plurality of regions of the first volume when the first ones of the plurality of regions of the first volume are indicated as not replicable to the second volume by the replication bitmap, regardless of whether the first ones of the plurality of regions of the first volume are indicated as being different by the difference bitmap, wherein the pair management table is configured to store, for each pair of volumes, a pair state of the first volume and the second volume, the pair state selected from a group comprising a first state indicating that the first volume and the second volume are defined as a replication pair with no data replicated, a second state indicating that the first volume and second volume are undergoing synchronization, a third state indicating that the first volume and second volume are synchronized, and a fourth state indicating that the first volume and second volume are suspended, and wherein the processor is further configured to, for a read request made to the second volume;

return an error message responsive to the pair state being the first state;

return an error message responsive to the pair state being the second state;

return an error message responsive to the pair state being the third state; and responsive to the pair state being the fourth state;

return data from the second volume in response to the read request responsive to the replication bitmap indicating that data is to be replicated to the second volume; and return an error message responsive to the replication bitmap indicating that data is not to be replicated to the second volume.

2. The storage system of claim 1, wherein the storage system is communicatively coupled to a server configured to:

determine volume identifiers for one or more of the plurality of storage volumes of the storage system from device identifiers and address ranges; and send a replication bitmap update request to the storage system corresponding to the one or more of the plurality of storage volumes based on the volume identifiers;

wherein the processor is configured to update the replication bitmap for the one or more of the plurality of storage volumes in response to the replication bitmap update request.

3. The storage system of claim 1, wherein the processor is further configured to, for a write request made to the first volume:

write data to the first volume;

responsive to the pair state being the second state, copy the data to the second volume for the replication bitmap indicating that the data is to be replicated to the second volume;

responsive to the pair state being the third state, copy the data to the second volume for the replication bitmap indicating that the data is to be replicated to the second volume; and responsive to the pair state being the fourth state, modifying difference bitmap to indicate that the data is different between the first volume and the second volume.

4. The storage system of claim 1, wherein the processor is further configured to:

store, in the pair management table, a permission bitmap configured from the server, the permission bitmap stores permission information indicative of, for each of the plurality of regions of the first volume, whether the each of the plurality of regions is permitted to be replicated or not permitted to be replicated;

wherein, for receipt of the command to replicate the first volume of the plurality of storage volumes to a second volume of the second storage system, the processor is configured to replicate only the first ones of the plurality of the first volume indicated as being permitted to be replicated.

5. A system, comprising:

a server communicatively coupled to a first storage system and a second storage system, the server configured to:

determine volume identifiers for a first plurality of storage volumes of the first storage system from device identifiers and address ranges associated with a replication request, identify, from the volume identifiers, a first volume from the first plurality of storage volumes of the first storage system to be replicated to a second volume of a second plurality of storage volumes of the second storage system, and issue a command to the first storage system to replicate the first volume to the second volume;

and the first storage system, comprising:

the first plurality of storage volumes, each of the first plurality of storage volumes comprising a plurality of regions;

a memory configured to store a pair management table comprising a plurality of entries each corresponding to a pair of volumes, each pair of volumes comprising a first volume of the plurality of storage volumes and a second volume of a second storage system, the pair management table stores, for each entry, a difference bitmap storing difference information indicating whether there are differences or not between the plurality of regions of the first volume of a respective pair of storage volumes and a second volume of the respective pair; and a processor, configured to, for receipt of the command to replicate the first volume to the second volume:

store, in the pair management table, a replication bitmap configured by a server that issued the command, wherein the replication bitmap stores replication information indicative of, for each of the plurality of regions of the first volume, whether the each of the plurality of regions is replicable to the second volume or not replicable to the second volume;

determine that first ones of the plurality of regions of the first volume are replicable to the second volume based on the replication bitmap stored in the pair management table;

in response to the determination, replicate, to the second volume, first ones of the plurality of regions of the first volume when the first ones of the plurality of regions of the first volume are (i) indicated as replicable to the second volume by the replication bitmap and (ii) indicated as being different by the difference bitmap; and not replicate, to the second volume, first ones of the plurality of regions of the first volume when the first ones of the plurality of regions of the first volume are indicated as not replicable to the second volume by the replication bitmap, regardless of whether the first ones of the plurality of regions of the first volume are indicated as being different by the difference bitmap, wherein the pair management table is configured to store, for each pair of volumes, a pair state of the first volume and the second volume, the pair state selected from a group comprising a first state indicating that the first volume and the second volume are defined as a replication pair with no data replicated, a second state indicating that the first volume and second volume are undergoing synchronization, a third state indicating that the first volume and second volume axe synchronized, and a fourth state indicating that the first volume and second volume are suspended, and wherein the processor is further configured to, for a read request made to the second volume;

return an error message responsive to the pair state being the first state;

return an error message responsive to the pair state being the second state;

return aa error message responsive to the pair state being the third state; and responsive to the pair state being the fourth state;

return data from the second volume in response to the read request responsive to the replication bitmap indicating that data is to be replicated to the second volume; and return an error message responsive to the replication bitmap indicating that data is not to be replicated to the second volume.

6. The system of claim 5, wherein the server is configured to:

send a replication bitmap update request to the first storage system corresponding to the one or more of the first plurality of storage volumes based on the volume identifiers;

wherein the processor is configured to update the replication bitmap for the one or more of the first plurality of storage volumes in response to the replication bitmap update request.

7. The system of claim 5, wherein the processor is further configured to, for a write request made to the first volume by the server:

write data to the first volume;

responsive to the pair state being the second state, copy the data to the second volume for the replication bitmap indicating that the data is to be replicated to the second volume;

responsive to the pair state being the third state, copy the data to the second volume for the replication bitmap indicating that the data is to be replicated to the second volume; and responsive to the pair state being the fourth state, modifying difference bitmap to indicate that the data is different between the first volume and the second volume.

8. The system of claim 5, wherein the processor is further configured to:

store, in the pair management table, a permission bitmap configured from the server, the permission bitmap stores permission information indicative of, for each of the plurality of regions of the first volume, whether the each of the plurality of regions is permitted to be replicated or not permitted to be replicated;

wherein, for receipt of the command to replicate the first volume of the plurality of storage volumes to a second volume of the second storage system, the processor is configured to replicate only the first ones of the plurality of the first volume indicated as being permitted to be replicated.

9. The system of claim 5, wherein the server is configured to:

process the replication request for one or more database tables stored in the first plurality of storage volumes;

determine the device identifiers and the address ranges based on locations of the one or more database tables in the first plurality of storage volumes.

* * * * *